(12) United States Patent
Heigl et al.

(10) Patent No.: US 6,825,628 B2
(45) Date of Patent: Nov. 30, 2004

(54) ELECTRONIC CONTROLLER FOR VEHICULAR WHEELCHAIR ACCESS

(75) Inventors: Keith D. Heigl, Corunna, IN (US); Ronald W. Goodrich, Logansport, IN (US); Donald S. Sturm, Dayton, OH (US)

(73) Assignee: The Braun Corporation, Winamac, IN (US)

( * ) Notice: Subject to any disclaimer, the term of this patent is extended or adjusted under 35 U.S.C. 154(b) by 196 days.

(21) Appl. No.: 10/142,712

(22) Filed: May 10, 2002

(65) Prior Publication Data

US 2003/0007851 A1 Jan. 9, 2003

Related U.S. Application Data

(63) Continuation-in-part of application No. PCT/US01/27102, filed on Aug. 31, 2001.
(60) Provisional application No. 60/229,922, filed on Sep. 1, 2000, now abandoned.

(51) Int. Cl.[7] .................................................. B60P 1/44
(52) U.S. Cl. ....................... 318/468; 318/266; 414/462; 414/540; 414/921
(58) Field of Search ................................. 318/264, 265, 318/266, 286, 466, 467, 468; 414/462, 540, 541, 545, 921

(56) References Cited

U.S. PATENT DOCUMENTS

| 3,651,965 | A | * | 3/1972 | Simonelli et al. ............ 414/540 |
| 4,251,179 | A | * | 2/1981 | Thorley ....................... 414/545 |
| 4,339,224 | A | * | 7/1982 | Lamb .......................... 414/501 |
| 5,299,904 | A | * | 4/1994 | Simon et al. ................ 414/541 |
| 6,064,165 | A |   | 5/2000 | Boisvert et al. |

* cited by examiner

*Primary Examiner*—Bentsu Ro
(74) *Attorney, Agent, or Firm*—Michael Best & Friedrich LLP

(57) ABSTRACT

A ramp deployment control system includes a controller, a kneeling motor operatively coupled to the controller and a ramp motor operatively coupled to the controller. The controller energizes the kneeling motor to kneel or stand a vehicle and energizes the ramp motor to deploy or stow a ramp. The controller is operatively coupled to a communication pathway, and a door control system is operatively coupled to the controller. The door control system is operable to monitor and control operation of a door. A standard control module is operatively coupled to the communication pathway and is operable to send door operation commands on the communication pathway. The controller selectively delays execution of the door operation commands by the door control system while operating the ramp motor to deploy or stow the ramp.

23 Claims, 27 Drawing Sheets

ELECTRONIC CONTROLLER FOR VEHICULAR WHEELCHAIR ACCESS

REFERENCE TO RELATED APPLICATIONS

This application is a continuation-in-part (CIP) of International Patent Application No. PCT/US01/27102, filed Aug. 31, 2001, now pending, which claims the benefit of U.S. Provisional Patent Application Ser. No. 60/229,922, filed Sep. 1, 2000, now abandoned, and which are hereby incorporated by reference in their entirety.

BACKGROUND OF THE INVENTION

The present invention relates to ramp control systems, and more specifically, but not exclusively, relates to a ramp control system configured to detect obstructions during deployment of a ramp.

Wheelchair ramps provide access for persons in wheelchairs to vehicles such as vans, busses, and other modes of transportation. Wheelchair ramps for vehicles can be deployed by using a variety of controls including interior controls, switches incorporated into locks, and remote controls. In order to prevent a person from being crushed or injured during deployment and stowing of the ramp, typical wheelchair control systems require an operator to constantly push the control button during ramp operation. This requirement that the operator actively hold down the control button during ramp operation creates a number of problems. The operator may have difficulty with constantly pressing the control button due to fatigue. There is also an inconvenience and waste of time to the operator since the operator's attention must be directed to the ramp. Further, with remote control systems, radio interference can halt the deployment/stowing cycle of the ramp.

Another difficulty faced by wheelchair ramp manufacturers is integrating their wheelchair ramp deployment systems with the pre-existing, standard control systems in vehicles, which are typically installed by the original equipment manufacturer (OEM). These OEM control systems are used control vehicle functions, such as operating locks, windows and sliding van doors. In the past, the ramp deployment system is not integrated with the OEM control system such that each operates independently from one another. Since the two systems do not communicate with one another, one-touch (automatic) control of the ramp is practically impossible. For example, by not knowing whether the door is open, the ramp deployment system can not safely deploy the ramp. To solve this dilemma, the ramp system is configured such that human supervision is required to monitor the operational status of the door and the ramp. In order to deploy and stow the ramp, two separate remote controls are typically used, one for operating the locks and/or doors, which is usually OEM supplied, and a separate one for controlling the ramp deployment system, which is supplied by the ramp system manufacturer. The human operator must first use the OEM supplied remote to unlock and open the vehicle's door. Once the door is fully open, the operator can then initiate ramp deployment with the ramp system's remote control. As should be appreciated, using the two separate controls to operate the ramp can be rather cumbersome.

Safety is always a concern when designing systems for deploying wheelchair ramps from vehicles. Without proper safety controls, serious injuries can result from operating such systems. For example, during closure of a vehicle door, an arm or some other extremity can be crushed between the door and the vehicle's body. To avoid such accidents, some automatic van-door closing systems, which are not specifically designed for use with wheelchair ramp systems, are equipped with obstruction detection systems. In one such obstruction detection system, a tape switch sensor is positioned along the edge of the door in order to sense when an obstruction is blocking door travel. However, tape switches are typically expensive and due to their location are prone to damage.

Another type of system detects obstructions by monitoring door motor current during operation. An obstruction is detected when the current supplied to the door motor exceeds a maximum value. Typically though, as the door components wear overtime friction tends to increase which in turn increases the amount of current drawn by the motor during door movement. This increase in current drawn by the motor can cause the obstruction system to detect obstructions when none are present. Although typical current sensing systems adequately detect obstructions through most of the door's travel, such systems have difficulty in detecting obstructions when the door is near closure, where obstruction detection is critically needed.

To make access to the vehicle easier, ramp designers try to reduce the slope of a deployed ramp by reducing the ramp's deployment angle. Some vehicles are equipped with an optional kneeling system that lowers the vehicle so as to reduce the deployment angle. These kneeling systems typically have sensors for determining whether the vehicle is in a standing or kneeling position. However, these sensors can be quite expensive to install and maintain. These sensors are also prone to failure, which can reduce the overall reliability of the kneeling system.

Therefore, there has been a long felt need for a ramp control system that can be operated by a single push or momentary contact of a control device and which has improved safety features.

SUMMARY OF THE INVENTION

A wheelchair ramp control system for a vehicle according to the present invention allows for automatic single-touch operation of a wheelchair ramp by having a controller that intercepts communications with an OEM control module, which controls the locks and doors of the vehicle. By intercepting these communications, the ramp controller coordinates and synchronizes ramp deployment and stowing operations with the OEM control module. In one embodiment, the controller utilizes its own obstruction detection system to detect door obstructions. In another embodiment, the OEM control module is used to detect door obstructions.

Further objects, features, advantages, and aspects of the present invention shall become apparent from the detailed drawings and description contained herein.

DESCRIPTION OF THE ILLUSTRATED EMBODIMENTS

Figure 1:
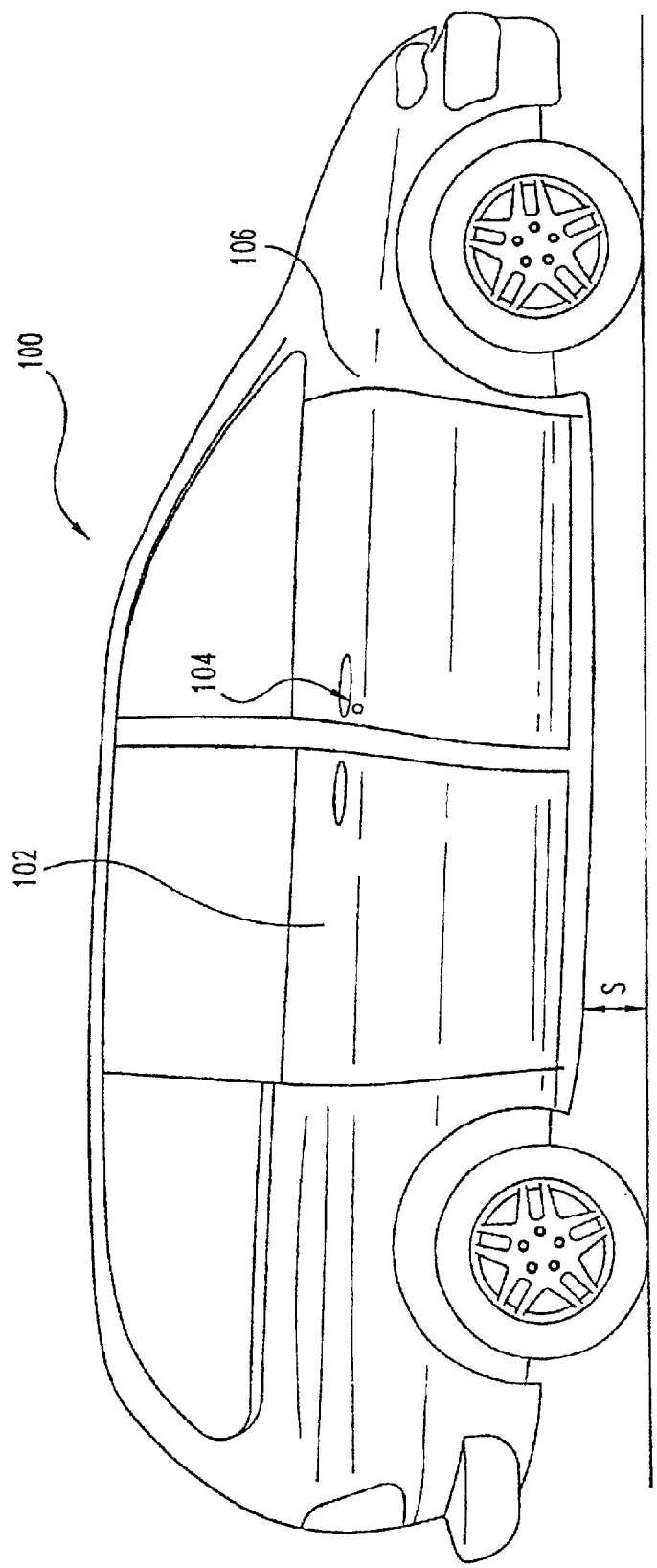
FIG. 1 shows a side view of a vehicle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the illustrated embodiments and any further applications of the principles of the invention as described herein are contemplated as would occur to one skilled in the art to which the invention relates. One embodiment of the invention is shown in great detail, although it will be apparent to those skilled in the art that some features that are not relevant to the invention may not be shown for the sake of clarity.

FIG. 1 depicts a side view of a vehicle 100. Vehicle 100 includes at least one vehicle door 102, at least one vehicle lock 104 for locking/unlocking vehicle doors 102, and a vehicle body 106. Vehicle door 102 can be any type of door as generally known. In the illustrated embodiment, vehicle door 102 is a sliding door, and vehicle 100 is a CHRYSLER TOWN & COUNTRY brand minivan (DaimlerChrysler Corp., Auburn Hills, Mich.). Although vehicle 100 shown in FIG. 1 is a minivan, it should be appreciated that the present invention can be used on cars, buses, and other forms of transportation as known by those skilled in the art.

Figure 2:
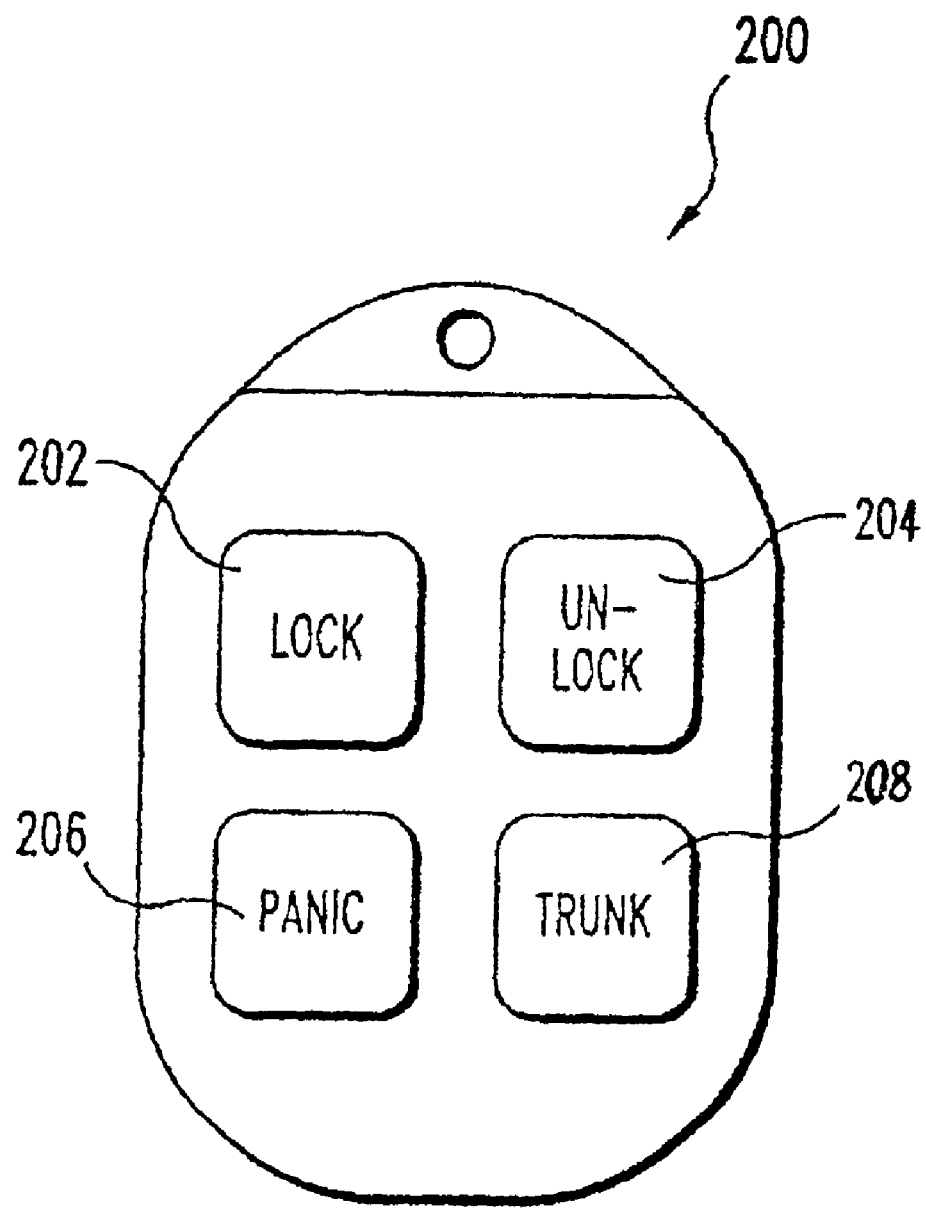
FIG. 2 shows a top view of a keyless entry remote control.

Vehicle locks 104 can be locked or unlocked using a standard keyless entry remote control supplied by the manufacturer of vehicle 100 or installed by a third party. Compared to prior ramp systems, which required separate remotes for operating the ramp and the doors, the ramp deployment system according to the present invention only requires the use of a single remote control that usually comes standard from the manufacturer of vehicle 100. An example of such a remote control 200 is shown in FIG. 2. Keyless entry remote control 200 includes a lock button 202 for locking vehicle doors 102 and an unlock button 204 for unlocking vehicle doors 102. Remote 200 also includes a panic button 206 for emergencies and a trunk button 208 for unlocking a trunk or tailgate of the vehicle 100. Instead of using a separate remote control to control ramp deployment/stowing, the system according to the present invention uses the same standard keyless remote 200 to control ramp deployment/stowing. This single keyless remote control 200 is used to lock/unlock the vehicle 100 as well as to deploy/stow a ramp. It should be understood that multiple keyless remote controls 200 with the same functionality (for different operators) can be used for the same vehicle 100. As should be further understood, the present invention also has applications with other types of remote controls with different control buttons and functions, including wireless remote controls that are provided solely for operating vehicle door 102 and/or ramp deployment/stowing. The present invention also has application with hardwired and remote controls provided on the vehicle and/or on the ramp system.

Figure 3:
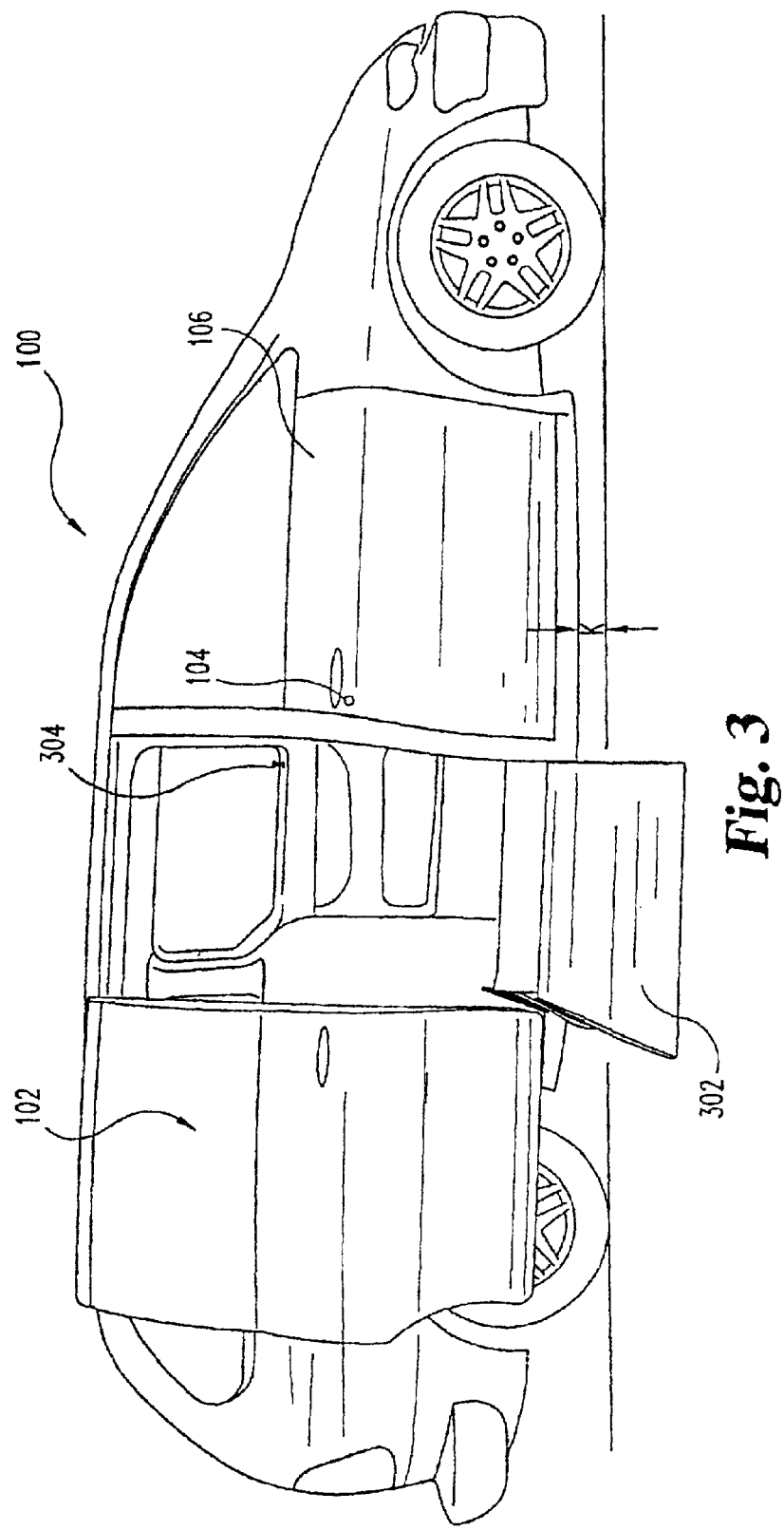
FIG. 3 shows a side view of the vehicle of FIG. 1 with a ramp deployed.

A ramp 302 for vehicle 100 is shown in a deployed mode in FIG. 3. Vehicle 100 further includes interior controls 304 for operating doors 102 and ramp 302. While the present invention is described herein with reference to a ramp system, the present invention also has application with other vehicular lifting and access systems known in the art.

Vehicle 100 can include an optional kneeling feature, particularly if the vehicle floor has been lowered to accommodate ramp 302. When ramp 302 is deployed, vehicle body 106 is lowered (kneeled) towards the ground from a standing position S (FIG. 1) to a kneeling position K (FIG. 3). This kneeling function uses the suspension of vehicle 100 to lower vehicle body 106. By lowering body 106 of vehicle 100, the slope of ramp 302 is decreased so as to make entry into vehicle 100 easier. Once the passenger is inside vehicle 100, ramp 302 can be stowed and vehicle body 106 can be raised to standing position S.

Figure 4:
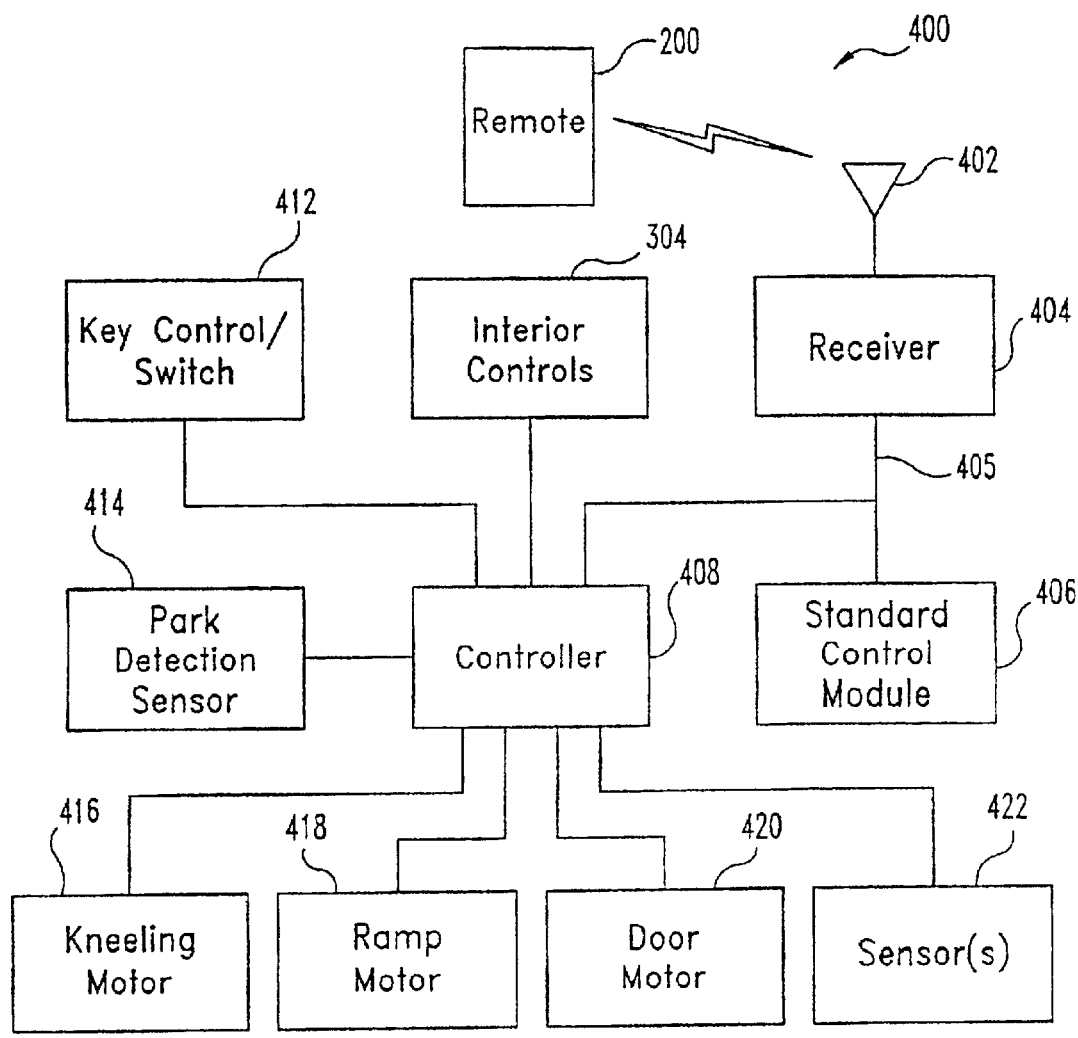
FIG. 4 shows a diagrammatic view of a control system according to one embodiment the present invention.

A control system 400 according to one embodiment of the present invention is shown in FIG. 4. System 400 includes remote control 200 for controlling system 400, an antenna 402, and a receiver 404 operatively coupled to antenna 402 that receives wireless control signals from remote control 200. Receiver 404 is operatively coupled through electronic communication pathway 405 to a standard control module (body control module) 406. Standard control module 406 is typically an OEM installed component. Receiver 404 receives a signal from remote control 200 and sends a control signal through communication pathway 405 to standard control module 406, which controls locks 104 of vehicle 100. It should be understood that standard control module 406 can control other generally known standard features such as power windows.

Remote control 200, receiver 404, and standard control module 406 are all standard components supplied by a manufacturer of vehicle 100 or installed by the vehicle owner or a third party. Receiver 404 interprets the signal received from remote 200 to determine the requested function. For example, a remote operator can push unlock button 204 once to open the driver side door 102. Receiver 404 then sends a serial data signal in binary form corresponding to an "unlock" driver side door command through communication pathway 405 to control module 406, which unlocks driver side door 102. It is contemplated that receiver 404 can communicate with control module 406 in other manners as generally known by those skilled in the art. In another example, when unlock button 204 is pushed twice, receiver 404 interprets this signal and sends a binary "unlock-all doors" signal through communication pathway 405 to standard control module 406. Standard control module 406, after receiving this signal, unlocks all doors 102 of vehicle 100.

System 400 includes a controller 408 that is operatively coupled to communication pathway 405. Controller 408 is operatively coupled to interior controls 304, at least one key access control (switch) 412, at least one park detection sensor 414, and at least one position sensor 422. It should be understood that interior controls 304, key control 412, park detection sensor 414, and sensors 422 can also be operatively coupled to controller 408 through receiver 404, standard control module 406 and/or other systems. Controller 408 is operatively coupled to a kneeling motor 416, a ramp motor 418, and a door motor 420. Motors 416, 418 and 420 in the illustrated embodiment are direct current (DC) motors. As should be appreciated, alternating current (AC) motors can alternatively be used. In one embodiment, the components of system 400 are operatively coupled together with electrically conductive wires for communication by electrical signals. It is contemplated that the components can be operatively coupled together in other manners. For example, the components can be coupled together through fiber optics, radio transmissions, hydraulics, mechanical linkages, and/or pneumatics to name a few.

Controller 408 can be a programmable logic control system (PLC), a microprocessor, or other type of electronic controller as known by those skilled in the art. Controller 408 can be composed of one or more components of a digital and/or analog type. Controller 408 can be programmable by software and/or firmware, a hardwired state-machine or a combination of these. In one form, controller 408 is based on a Motorola 68C705P6 microprocessor that includes four A/D (analog-to-digital) converter channels. Controller 408 is operatively coupled to communication pathway 405 in order to detect signals sent by receiver 404. Controller 408 uses the signals in communication pathway 405 to control and synchronize the operation of motors 416, 418, and 420 with the rest of vehicle 100. Controller 408 also receives inputs from interior controls 304 of vehicle 100. Key control 412 controls locks 104 on vehicle doors 102. In one embodiment, key control 412 is located in key lock 104 on passenger side door 102. Key control 412 detects the position (lock/unlock) of lock 104 when a key is inserted in lock 104. For example, when lock 104 is held at the unlock position for a specified period of time all doors 102 of vehicle 100 are unlocked and ramp 302 is deployed. Controller 408 also receives a signal from park detection sensor 414. Park detection sensor 414 tells controller 408 whether vehicle 100 is in park or is in some other state such as drive or reverse. Controller 408 uses the information provided by park detection sensor 414 to prevent accidental operation. For example, controller 408 can halt deployment of ramp 302 if vehicle 100 is placed out of park. Controller 408 uses position sensors 422 to detect the position of ramp 302, door 102 and other components of vehicle 100. It is contemplated that system 400 can also include other types of controls and sensors as would be contemplated by those skilled in the art.

Kneeling motor 416 is used to kneel and stand vehicle 100. Ramp motor 418 is used to deploy and stow ramp 302, and door motor 420 is used to open and close vehicle door 102. Controller 408 energizes and de-energizes electric motors 416, 418, and 420 to control various functions of vehicle 100. Controller 408 monitors the current supplied to motors 416, 418, and 420. In one embodiment, controller 408 has three A/D converter channels that monitor the direct current supplied by the three different respective motors 416, 418, and 420. In order to measure the current, current sensing resistors are operatively coupled to these A/D converter channels. It should be appreciated that controller 408 can be used in conjunction with standard control module 406 or can supplant standard control module 406. System 400 can also include multiple controllers 408 to separately control the individual motors 416, 418, and 420. In addition, it is contemplated that controller 408 can incorporate a separate receiver to receive signals directly from remote 402. Although single motors 416, 418, and 420 are shown, system 400 can also include multiple motors 416, 418, and 420. In addition, system 400 can include other types of motors as generally known to those skilled in the art to control vehicle functions, such as automatic window motors.

In one embodiment, controller 408 includes at least one status indicator that indicates the status of the components of system 400. In one form, interior controls 304, key control 412, park detection sensor 414, and sensors 422 are normally open single pole single throw (SPST) switches with one contact connected to chassis ground. Light-emitting diodes (LED's) are used to indicate the status of these switches and motors 416, 418, and 420. It should be understood that other types of indicators can also be used. Controller 408 can further include indicators for indicating obstructions, power-up, invalid conditions (such as ramp 302 deploying while door 102 is not open), and/or time-outs of operation cycles.

Figure 5:
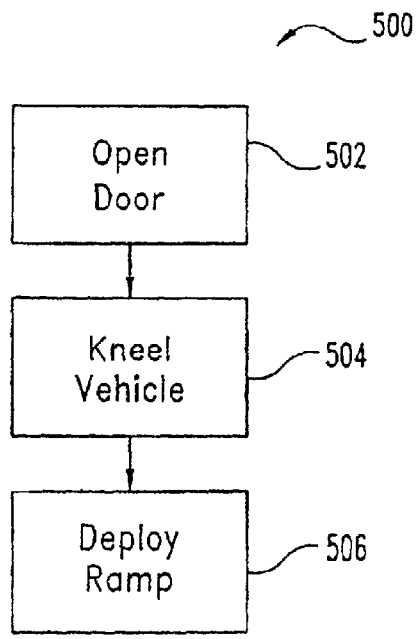
FIG. 5 shows a flow diagram illustrating one process for deploying the ramp.

FIG. 5 shows a flow diagram 500 illustrating a process for deploying ramp 302 according to one embodiment of the present invention. In stage 502, door 102 is opened. Vehicle 100 is kneeled in stage 504, and ramp 302 is deployed in stage 506. The door opening in stage 502 and vehicle kneeling in stage 504 can occur sequentially, simultaneously, or in a different order than is shown in FIG. 5. Further, ramp 302 can be deployed before, during or after vehicle 100 is kneeled. It is contemplated that the above-described stages can occur in other sequences.

Figure 6:
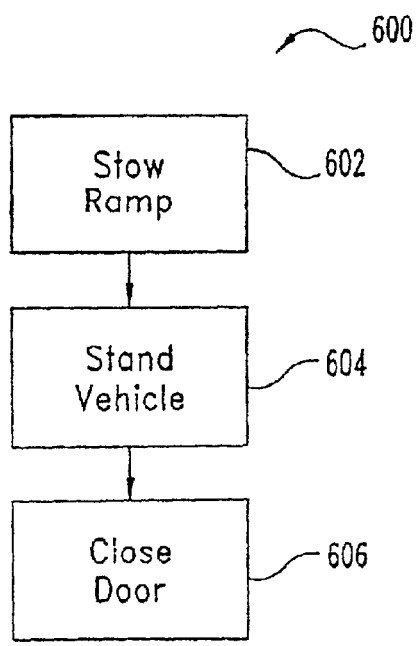
FIG. 6 shows a flow diagram illustrating one process for stowing the ramp.

A flow diagram 600 illustrating a process for stowing ramp 302 according to the present invention is shown in FIG. 6. In stage 602 of the process, ramp 302 is stowed. Body 106 of vehicle 100 is raised in stage 604, and vehicle door 102 is closed in stage 606. In another form, vehicle body 106 is raised before ramp 302 is stowed. In still yet another form, ramp 302 stowing in stage 602 and vehicle body 106 standing in stage 604 occur simultaneously. Further, it should be appreciated that door 102 can be closed before, during, or after vehicle body 106 is raised. It is contemplated that the above-described stages can occur in other sequences.

System 400 of the present invention allows for safe momentary contact or single-touch control of the ramp system, because system 400 is able to detect obstructions during operation. Single-touch control can be initiated by pressing a control, or by pressing and releasing the control. With single touch-control, system 400 can automatically control the operation of a component, such as ramp 302, through a complete operation cycle without needing additional user input.

System 400 can further include a safety interrupt (stop/restart) feature. Controller 408 will de-energize (wait) motors 416, 418, and 420 if controller 408 receives any signal from controls 200, 304, 412, and/or park detection sensor 414 when one of motors 416, 418, and 420 is running. One benefit of this optional safety interrupt feature is that the operator, during the excitement of an emergency, does not need to press a specific control button in order to halt operation, any button will work. For convenience purposes, the safety interrupt has a feature that allows for resumed operation when a control button is accidentally pushed. If controller 408 receives a second signal corresponding to the original operation of the motor, the de-energized motor will be re-energized to continue the previous operation.

Figure 7:
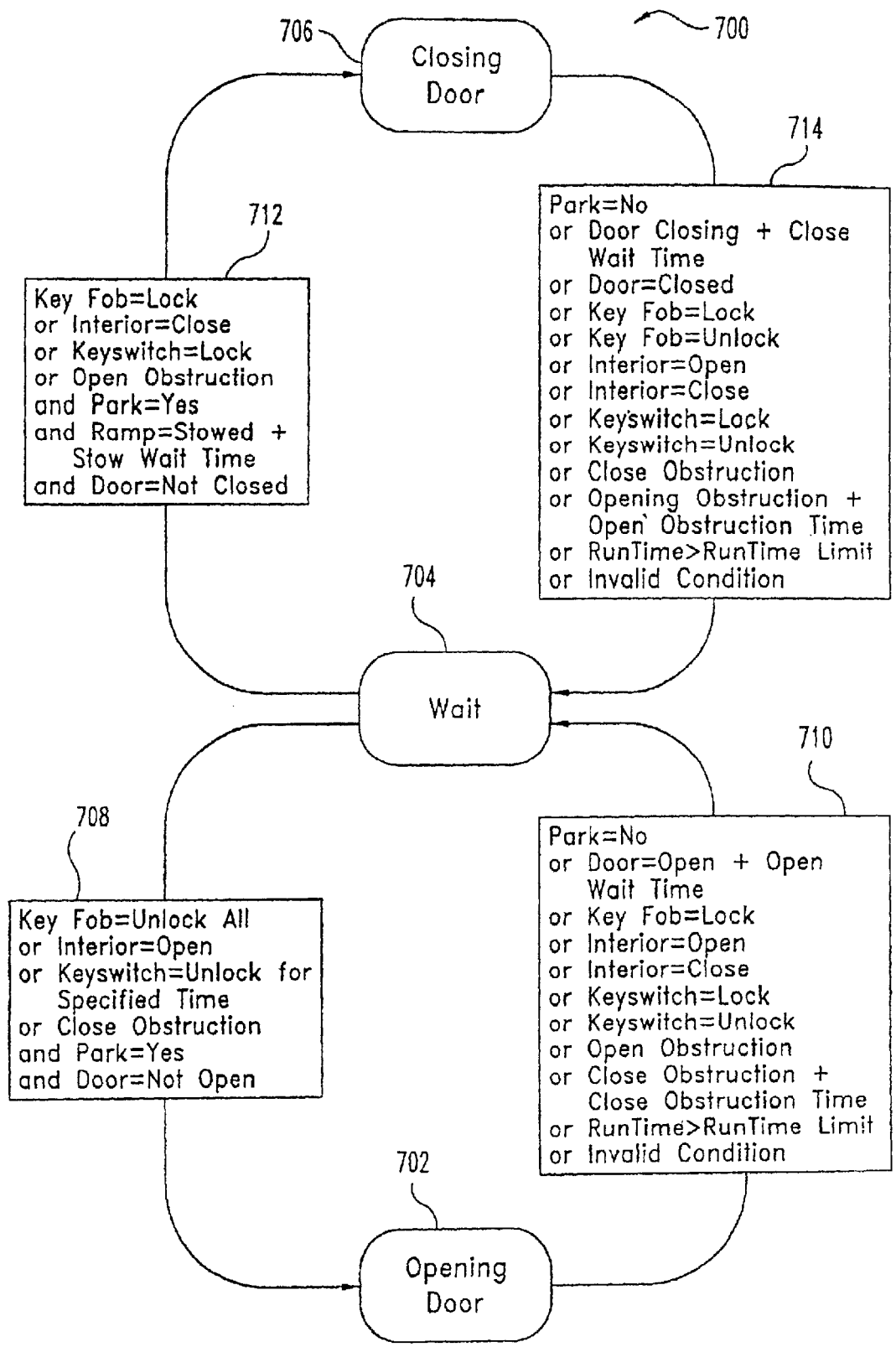
FIG. 7 shows a state diagram illustrating one process for controlling a door.

A diagram 700 illustrating a door operation process according to one embodiment of the present invention is shown in FIG. 7. The process for controlling door 102 includes an opening door state 702, a wait state 704, and a closing door state 706. The process further includes conditions 708, 710, 712, and 714 that will cause a change in state. During opening door state 702, door motor 420 opens door 102, and in door closing state 706, door motor 420 closes door 102. When system 400 is in wait state 704, door motor 420 is idle. It should be understood that door motor 420 can also include a brake for braking door motor 420 when motor 420 is in wait state 704.

If open door condition(s) 708 are satisfied, then door 102 can be placed into open door state 702 in which door motor 420 is energized to open door 102. For example, if remote control 200 (key fob) sends an "Unlock All" signal to receiver 404 (e.g., two pushes of unlock button 204), receiver 404 sends an "Unlock All" signal to standard control module 406 to unlock all locks 104 of vehicle 100. Controller 408 "snoops-in" on communication pathway 405 and retrieves the "Unlock All" signal. Controller 408 can also receive an open ("Unlock All") signal from interior controls 304 and can receive the "Unlock All" signal from key control 412, when lock 104 is in the unlock position for a specified period of time. In one embodiment, this specified period of time is two (2) seconds. Controller 408 also checks park detection sensor 414 to determine whether vehicle 100 is in park, and controller 408 determines whether door 102 is not open. If vehicle 100 is out of park and/or door 102 is fully open, then door 102 will not be opened.

Door motor 420 will also be placed into opening state 702 to backtrack from closing when an obstruction is detected during closing of door 102 in closing state 706. When an obstruction is detected during closing, door 102 will backtrack and will remain in opening state 702 for only a specified close obstruction period of time specified in condition 710 ("Close Obstruction+Close Obstruction Time") so that door 102 will move a certain distance away from the obstruction before stopping. In one embodiment, this specified close obstruction period of time is 0.5 seconds. It is contemplated that door 102 can be opened using other types of inputs and conditions as would occur to those skilled in the art. It should be understood that conditions 708, 710, 712, and 714 can omit conditions and/or include additional conditions other than those specifically listed herein.

During door opening state 702, controller 408 constantly monitors a number of open-wait conditions 710 in order to determine whether door 102 should be placed into wait state 704. In wait state 704, door motor 420 is de-energized so that door motor 420 does not move door 102. For example, if vehicle 100 is removed from park, door 102 will be placed in wait state 704 and will stop opening.

Controller 408 has the safety interrupt feature. When controller 408 during door opening state 702 receives any signals from remote control 200, interior controls 304, and/or key controls 412, controller 408 will de-energize door motor 420 and place door motor 420 into wait state 704. This ensures that the operator does not need to press a specific key to halt operation in case of an emergency. For example, if any button of remote control 200 was accidentally pushed during opening state 702, door motor 420 will be placed in wait state 704. The person operating remote control 200 can re-start opening of door 102 again by simply pushing unlock button 204 twice again to send an "Unlock All" signal to satisfy opening condition 708. This safety interrupt feature gives the operator the added safety and flexibility to stop and re-start operation of vehicle door 102.

Other conditions in open-wait condition 710, if satisfied, will also place door motor 420 into wait state 704. In condition 710, door motor 420 will be placed into wait state 704 when motor 420 runs longer than a specified run time limit ("Run Time>Run Time Limit"). Door 102 should open within this specified run time limit. If door 102 does not open within this specified run time limit, then controller 408 determines that an obstruction is in the way. In one embodiment, this specified run time limit is twenty-five (25) seconds. However, it should be appreciated that this run time limit can vary due to variations between vehicle models and due to other variables. Door motor 420 will also be placed into wait state 704 and then into closing door state 706 if an obstruction is detected ("Open Obstruction") during opening 702 in condition 710. Door 102 will backtrack in closing door state 706 for an open obstruction time limit specified in closing-wait condition 714 ("Opening Obstruction+Open Obstruction Time"). This open obstruction time limit in one embodiment is 0.5 seconds. After this open obstruction time limit, door motor 420 will be placed into wait state 704. Further, in condition 710, door 102 will be placed into wait state 704 after door 102 has reached the open position and an open wait time period has elapsed ("Door=Open+Open Wait Time"). This ensures that door 102 is completely open. In one embodiment, the door open wait time is 0.5 seconds. When controller 408 has any invalid conditions ("Invalid Conditions"), door motor 420 will also be placed into wait state 704.

Controller 408 will place door motor 420 into closing door state 706 if closing conditions 712 are satisfied. If, for example, remote 200 sends a lock signal to receiver 404 ("Key Fob=Lock"), controller 408 will start closing door 102 in closing state 706. In order to start closing door 706, vehicle 100 must be in park ("Park=Yes"), ramp 302 must be stowed for a specific stow wait time period ("Ramp=Stowed+Stow Wait Time"), and door 102 must not be closed ("Door=Not Closed"). In one embodiment, this stow wait time is 1.5 seconds. As described above, if an obstruction occurs during opening of door 102, door 102 will backtrack in closing door state 706 for the open obstruction time specified in condition 714. Closing-wait condition 714 also specifies the conditions for the safety interrupt feature for closing state 706. During closing state 706, when controller 408 receives any signals from remote control 200, interior controls 304, and/or key control 412, door motor 420 will be placed into wait state 704. Door motor 420 can start closing again when controller 408 receives a signal to satisfy condition 712 again.

During closure of door 102, door motor 420 will continue in closing state 706 for a specified closure wait time period ("Door Closing+Close Wait Time"). After this closure wait time, door motor 420 will be de-energized in wait state 704. This closure wait time period is 1.5 seconds in one embodiment. It is contemplated that the close wait time period limit can include other time periods.

Door motor 420 will change states if controller 408 detects an obstruction. Door 102 will backtrack when an obstruction is detected. For example, if an obstruction is detected during closing state 706 ("Close Obstruction"), door 102 will be placed into wait state 704 and then condition 708 will place door 102 into opening door state 702 to backtrack door 102 for the close obstruction time limit specified in condition 710 ("Close Obstruction+Close Obstruction Time").

Figure 8:
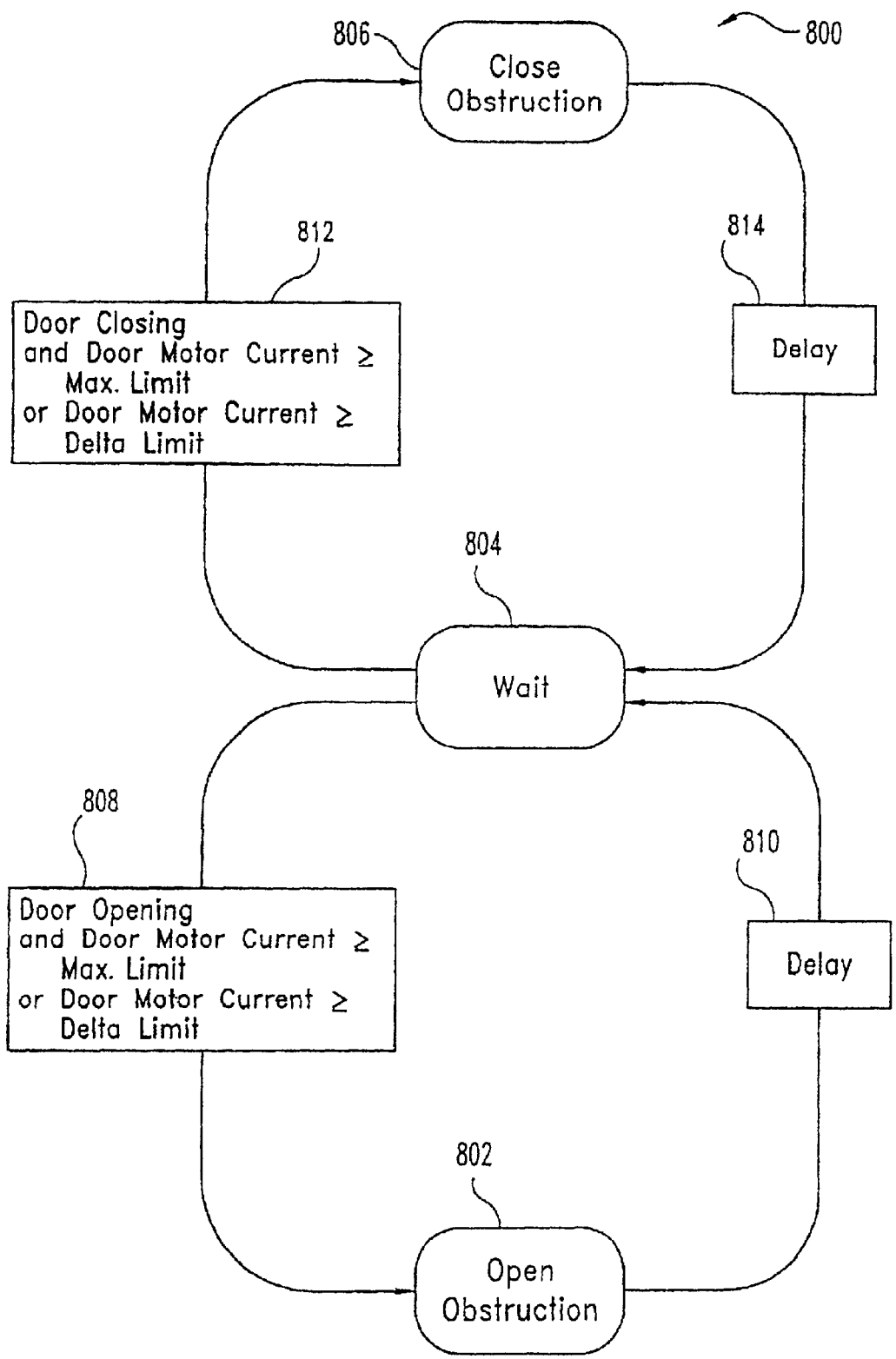
FIG. 8 shows a state diagram illustrating one process for detecting door obstructions.
Figure 11:
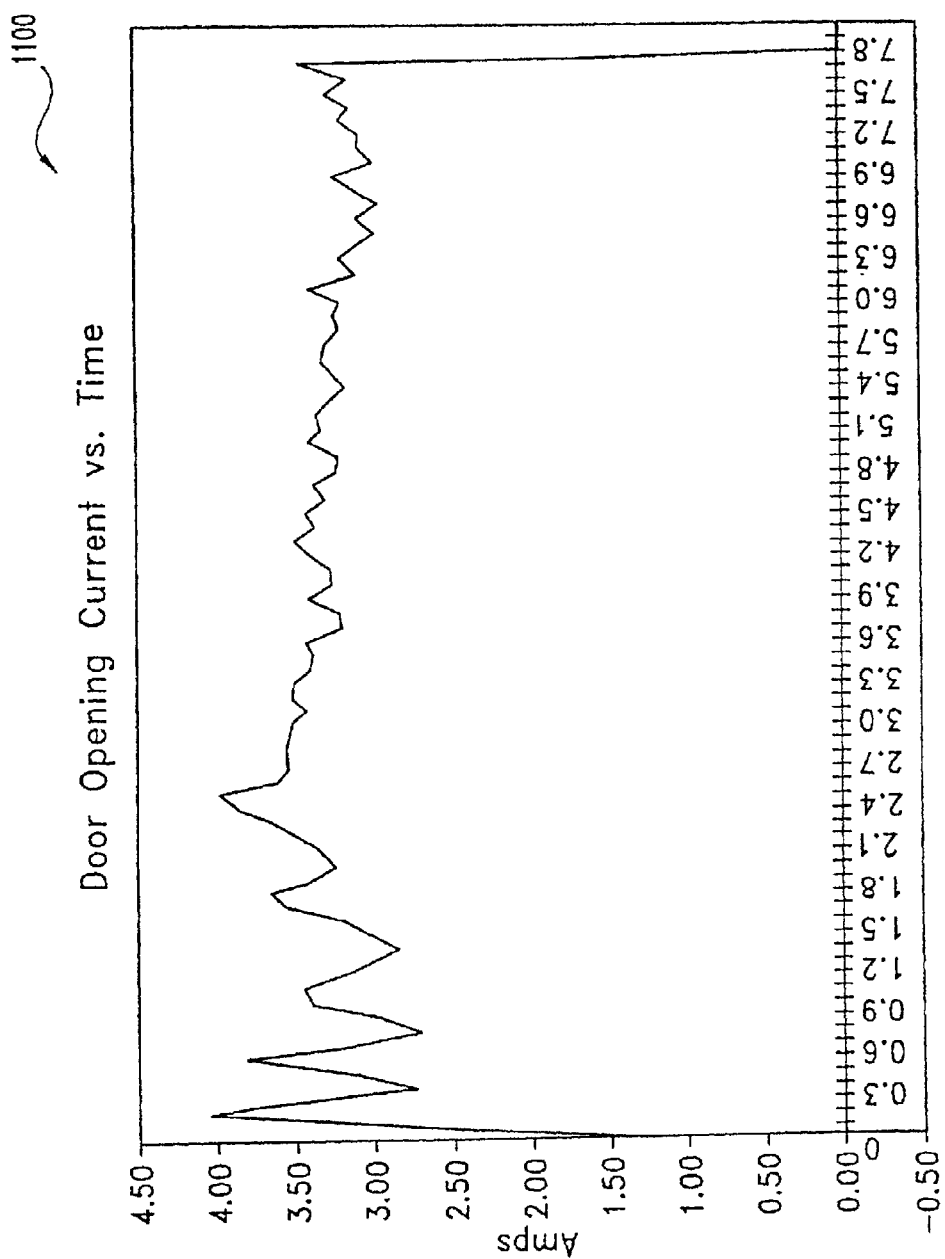
FIG. 11 shows a graph illustrating a door opening current profile.

Diagram 800 in FIG. 8 illustrates one process for detecting obstructions when door 102 is operated. Diagram 800 includes an open obstruction state 802, a wait state 804, and a close obstruction state 806. Diagram 800 further includes conditions 808, 810, 812, and 814. A graph 1100 illustrating an example of a door opening current profile is shown in FIG. 11. Controller 408 monitors an instantaneous electric current and determines a running average of electric current supplied to door motor 420 at specific intervals. In one embodiment, the instantaneous current is checked at 0.1-second intervals, and the running average current is averaged over a 1.6-second period. If the instantaneous current supplied to motor 420 exceeds a maximum current (motor stall) limit ("Door Motor Current≧Max. Limit"), then an obstruction is detected. In addition, if the current supplied to door motor 420 spikes to at least a change in current limit ("Door Motor Current≧Delta Limit"), then an obstruction is detected.

In condition 808, an open obstruction 802 will be detected if the door motor current is greater than or equal to a maximum current limit and/or the door motor F current is greater than or equal to a specific delta limit. After an open obstruction is detected in state 802, a specified delay 810 occurs, and door motor 420 is placed into wait state 804. In one embodiment, this delay is 0.5 seconds. Door motor 420 then waits in state 804.

Figure 12:
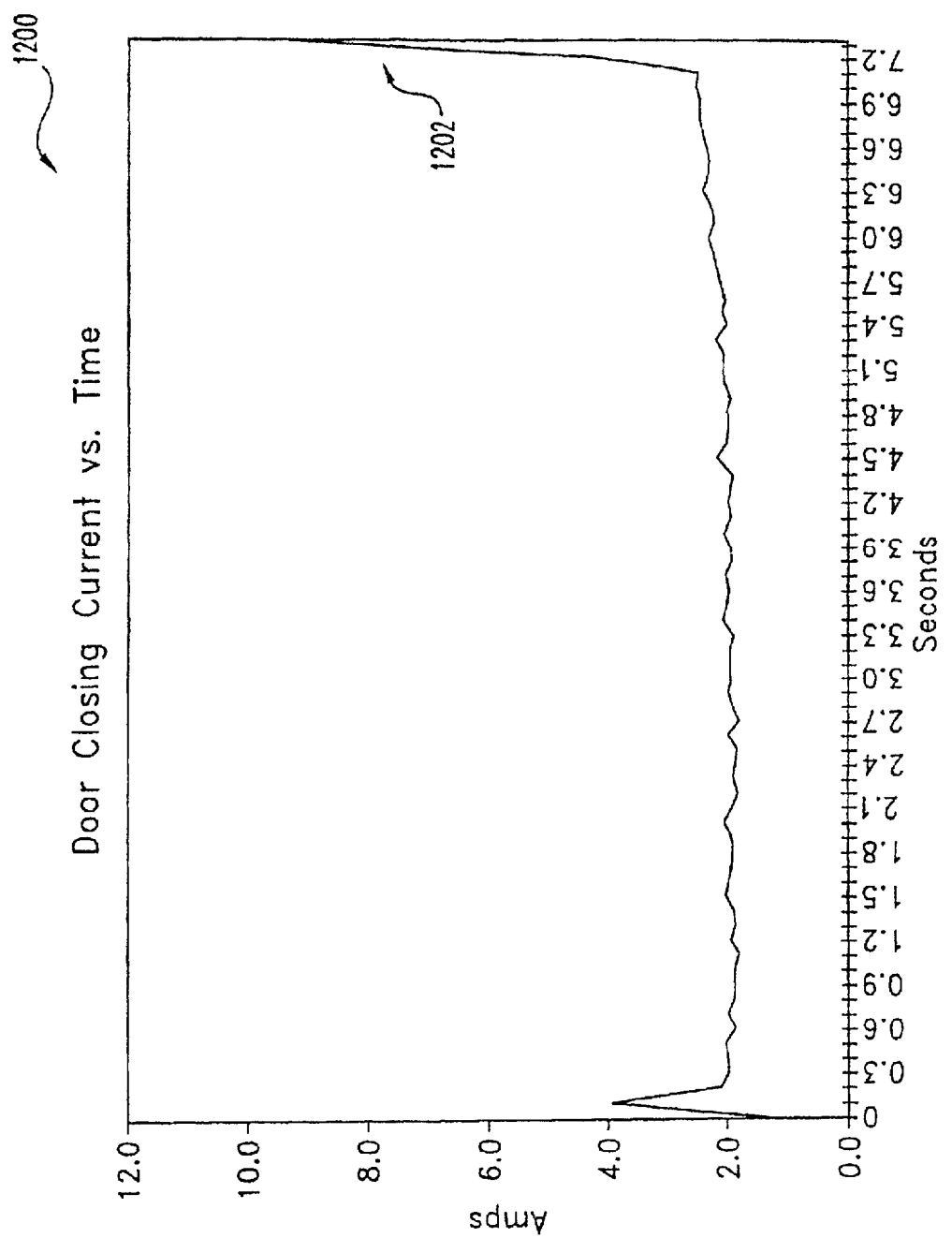
FIG. 12 shows a graph illustrating a door closing current profile.

During closing of door 102 in condition 812, if the door motor current is greater than or equal to a maximum door closing motor current limit level and/or the door motor current is greater than or equal to a specific closing change in current limit, then a closing obstruction is detected in state 806. System 400 delays for a specified period of time in state 814. In one embodiment, this delay is 0.5 seconds. A graph illustrating an example of a door closing current profile is shown in FIG. 12. It should be understood that the limits for both door opening and closing can be different. In one embodiment, the maximum current level for both door opening and closing is 7.2 amps, and the delta limit is 7.2 amps. It should be noted that since the maximum limit calculation is derived from comparing the average current to the maximum limit, gradual current changes are detected. With the delta limit, the instantaneous current is compared the moving average in order to detect an immediate spike in current. The above-described limits for particular motors are determined through evaluation of current profiles on a sample vehicle, empirically through testing, or through other techniques as would occur to those skilled in the art. It should be understood that these limits for opening and closing can be different depending on vehicle 100, door motor 420, and other conditions.

As door 102 clamps into a fully closed position, more power is required to completely close door 102. As shown in graph 1200 in FIG. 12, the current supplied to door motor 420 during closure has a spike 1202 just before door 102 is completely closed. This spike 1202 in current during closure would incorrectly signify an obstruction.

Figure 9:
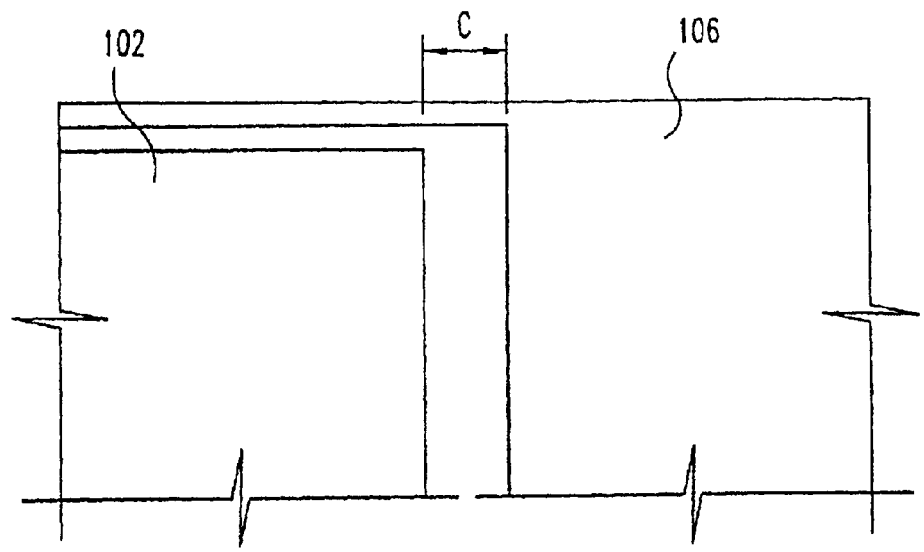
FIG. 9 shows a side view of the door during closure.

During the final closure of door 102, obstruction detection by measuring the current drawn by door motor 420 is disabled. As shown in FIG. 9, obstruction detection by measuring current is turned off over a specified closing distance C of door 102. A predetermined closing time period is determined by measuring the time it normally takes for door 102 to travel distance C in order to fully close door 102 against vehicle body 106. If door 102 fails to close within the closing time limit, then an obstruction is detected. In one embodiment, position sensors 422 monitor door 102 movement over closing distance C. As depicted in condition 714 in FIG. 7, if more than a specified period of time elapses before door 102 fully closes ("Door Closing+Close Wait Time"), then controller 408 detects an obstruction and door motor 420 is de-energized in wait state 704. In one embodiment, distance C is approximately four-inches (4"), and the elapsed time is approximately 1.5 seconds.

When door 102 is being opened, another position sensor 422 is used to determine when door 102 is in an opened position. As depicted in condition 710 in FIG. 7, door motor 420 runs for the open wait time period in condition 710 to ensure that door 102 is completely open ("Door=Open+Open Wait Time").

Figure 10:
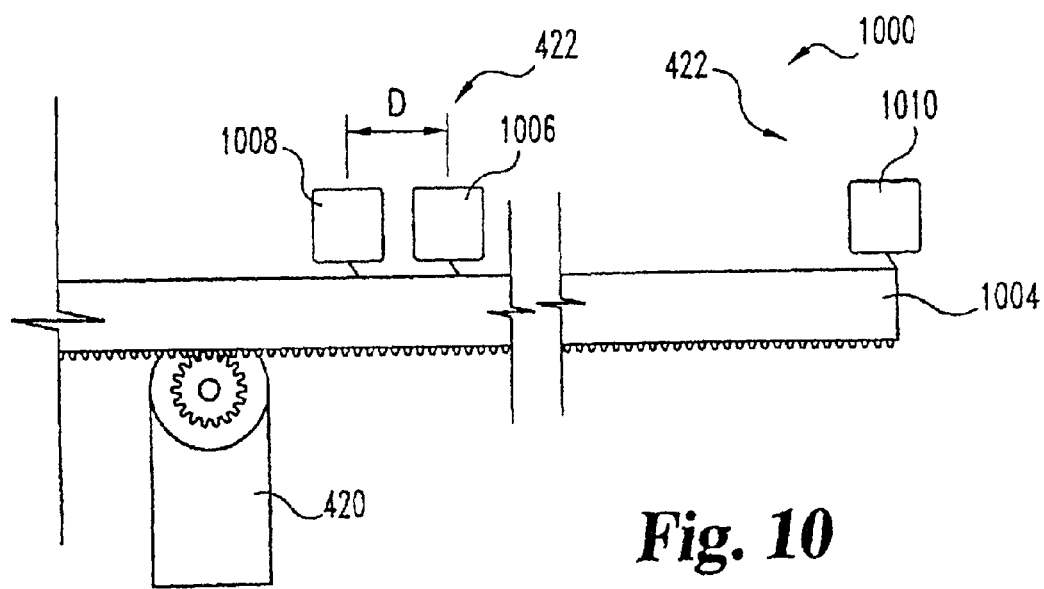
FIG. 10 shows a side view of a door rack assembly.

A door operation system 1000 for detecting obstructions according to one embodiment of the present invention is shown in FIG. 10. Door operation system 1000 includes door motor 420, a rack 1004 engaged with door motor 420, and position sensors 422 for sensing the position of door 102. Position sensors 422 include a closing sensor 1006, a closed sensor 1008, and an opened sensor 1010. Referring back to FIG. 4, position sensors 422 are operatively coupled to controller 408. Position sensors 422 can be any type of sensors generally known by those skilled in the art. For example, position sensors 422 can be proximity switches, micro-switches, and/or infrared switches, to name a few.

As shown in FIG. 10, rack 1004 is coupled to door 102 so that door motor 420 can move door 102. Closing sensor 1006 and closed sensor 1008 are used to determine the position of door 102 within specified closing distance C of door 102. Closing sensor 1006 detects that door 102 is at a specified distance C from body 106 of vehicle 100, and closed sensor 1008 is used to determine that door 102 is tightly closed against body 106 of vehicle 100. Sensors 1006 and 1008 are spaced distance D apart from each other. This distance D corresponds to closing distance C. During closure of door 102, when door 102 reaches specified closure distance C from body 106, closing sensor 1006 sends a closing signal to controller 408. Once door 102 is in a fully closed position, closed sensor 1008 sends a closed signal to controller 408. Controller 408 measures the time it takes door 102 to travel distance C. If this time is greater than the predefined limit, an obstruction is detected, and controller 408 will respond in accordance with the process illustrated in FIG. 7. In one embodiment, this time limit is 1.5 seconds. It should be appreciated that this time limit can vary depending on such factors as the power characteristics of door motor 420, the length of closing distance C, and other factors.

Opening sensor 1010 is used to determine when door 102 is fully open. Opening sensor 1010 sends a signal when door 102 is in an open position. Controller 408 runs door motor 420 for the door open wait time period, which is specified in condition 710, in order to ensure that door 102 is fully open. It is further contemplated that the system 1000 can include a second opening sensor 1010 that can be used to determine obstructions by monitoring travel time as door 102 opens. Further, it is understood that position sensors 422 can be located at different areas than what is shown in FIG. 10 in order to detect the position of door 102, and other types of sensor configurations can be used as would occur to those skilled in the art.

Figure 13:
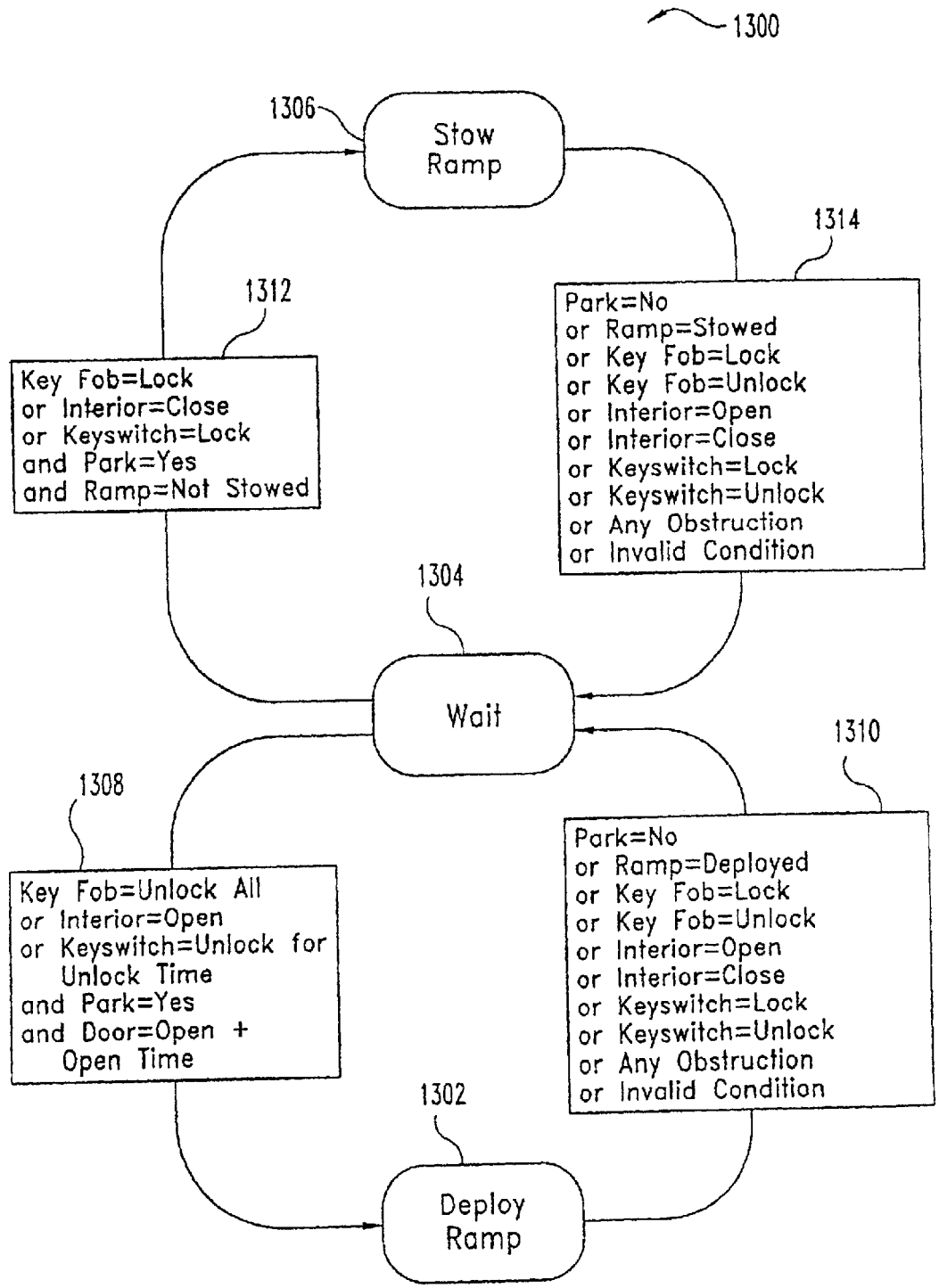
FIG. 13 shows a diagram illustrating one process for controlling the ramp.

A process for stowing ramp 302 according to one embodiment of the present invention will now be described in reference to FIGS. 13–18. A diagram 1300 illustrating a ramp operation process according to one form of the present invention is shown in FIG. 13. The process for controlling ramp 302 includes a deploy ramp state 1302, a wait state 1304, and a stow ramp state 1306. The process includes conditions 1308, 1310, 1312, and 1314 that, if satisfied, will cause a change in state. Starting from wait state 1304, controller 408 will deploy ramp 302 in state 1302 if deploy conditions 1308 are satisfied. For example, if controller 408 receives an "open" signal from interior controls 304, park detection sensor 414 and door 102 has been opened for a specified open period of time, ramp 302 will start to be deployed in state 1302. In one embodiment, this specified open time period for door 102 is 1.5 seconds and key switch 412 unlock time period is 2 seconds.

Controller 408 also uses the emergency start/restart operation feature for controlling ramp 302. During deployment state 1302 of ramp 302, if any input signal is received to satisfy deploy wait condition 1310, then the ramp deployment will be halted and ramp motor 418 will be placed into wait state 1304. In addition, ramp deployment state 1302 will change if any invalid conditions occur or any obstructions are detected.

Ramp 302 will be stowed if stowing conditions 1312 are satisfied. For example, while vehicle 100 is in park, ramp 302 is not stowed and remote 200 sends a "lock" signal to receiver 404, controller 408 will energize ramp motor 418 to begin stowing ramp 302 in state 1306. Controller 408 also uses the emergency start/restart operation feature for stowing ramp 302. In stowing state 1306, ramp 302 will stop if controller 408 receives a signal from remote control 200, interior controls 304, key controls 412, and/or park detection sensor 414. Ramp motor 418 will be placed into a wait state 1304, and ramp motor 418 will be de-energized by controller 408. It is contemplated that if controller 408 detects any obstruction during deployment 1302 or stowing 1306 of ramp 302, ramp motor 418 can backtrack ramp 302 in a direction away from the obstruction. Further, it should be understood that conditions 1308, 1310, 1312, and 1314 can include fewer conditional requirements than shown or additional conditional requirements.

Ramp obstructions are detected in one embodiment by monitoring the current supplied to ramp motor 418 with controller 408. If a maximum ramp current limit is reached, then an obstruction is detected. Further, if the motor current spikes (is greater than or equal to a delta current limit), then a ramp obstruction is also detected.

Figure 14:
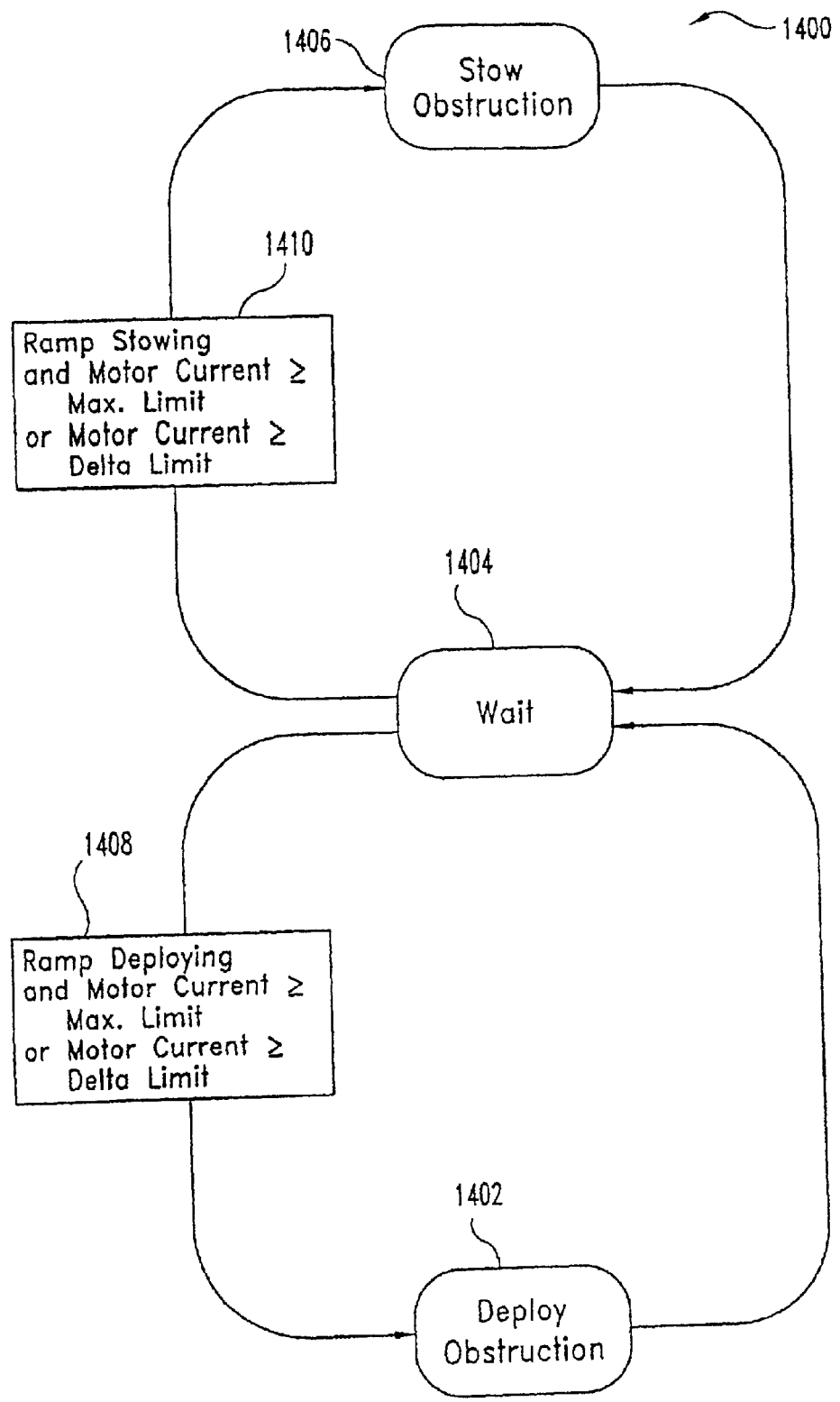
FIG. 14 shows a diagram illustrating one process for detecting ramp obstructions.

A diagram 1400 illustrating a ramp obstruction detection process according to one embodiment of the present invention is illustrated in FIG. 14. The obstruction detection process includes a deployment obstruction state 1402, a wait state 1404, and a stow obstruction state 1406. The process further includes conditions 1408 and 1410. When ramp 302 is being deployed, if in condition 1408 the motor current is greater than or equal the maximum deploying current limit and/or the motor current is greater than or equal to the change in current limit for deployment, then a deployment obstruction is detected in state 1402. Controller 408 will de-energize ramp motor 418 in wait state 1404. It also should be appreciated that ramp motor 418 can include a brake to prevent ramp 302 from falling in wait state 1404 and/or ramp 102 can be backtracked in wait state 1404. During stowing of ramp 302, if in condition 1410 the ramp motor current is greater than or equal to the maximum current limit and/or the change in ramp motor current is greater than or equal to the allowable ramp motor current delta limit, then a stowing obstruction is detected in stage 1406. Motor 418 will be de-energized by controller 408 in wait state 1404. In one embodiment, the ramp deployment maximum current level is approximately 2.2 amps, the ramp stowing maximum current level is approximately 7.2 amps, the ramp deployment change in current limit is approximately 2.0 amps and the ramp stowing change in current limit is approximately 3.9 amps. In still yet another embodiment, the ramp deployment maximum current limit is 1.5 amps, the ramp stowing maximum current is 7.0 amps, the ramp deployment change in current limit is 1.5 amps, and the ramp stowing change in current limit is 3.9 amps. It is contemplated that these limits can be varied depending on factors, such as the structural characteristics of ramp 302 and the characteristics of ramp motor 418, to name a few.

Figure 15:
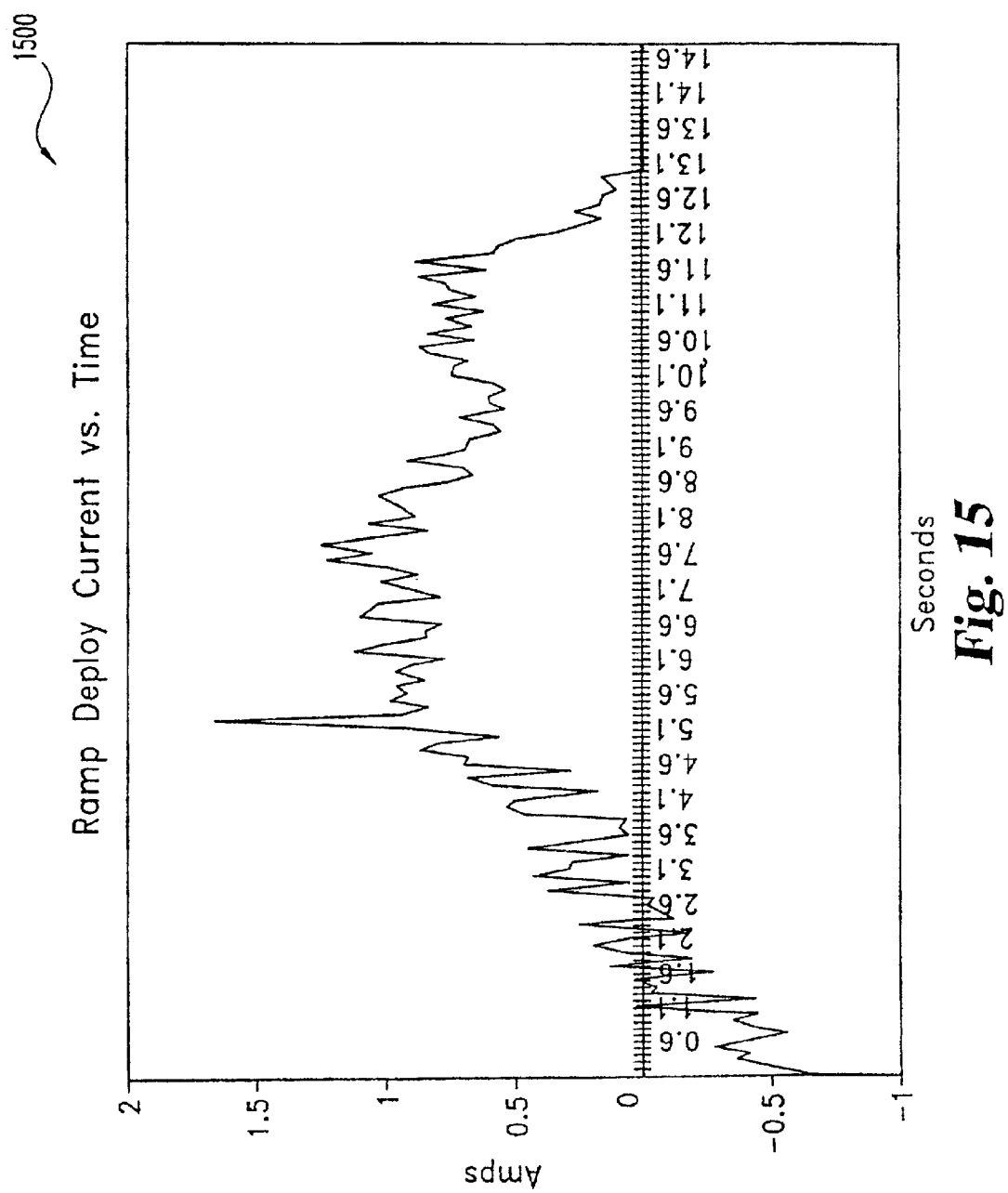
FIG. 15 shows a graph illustrating a ramp deployment current profile.
Figure 16:
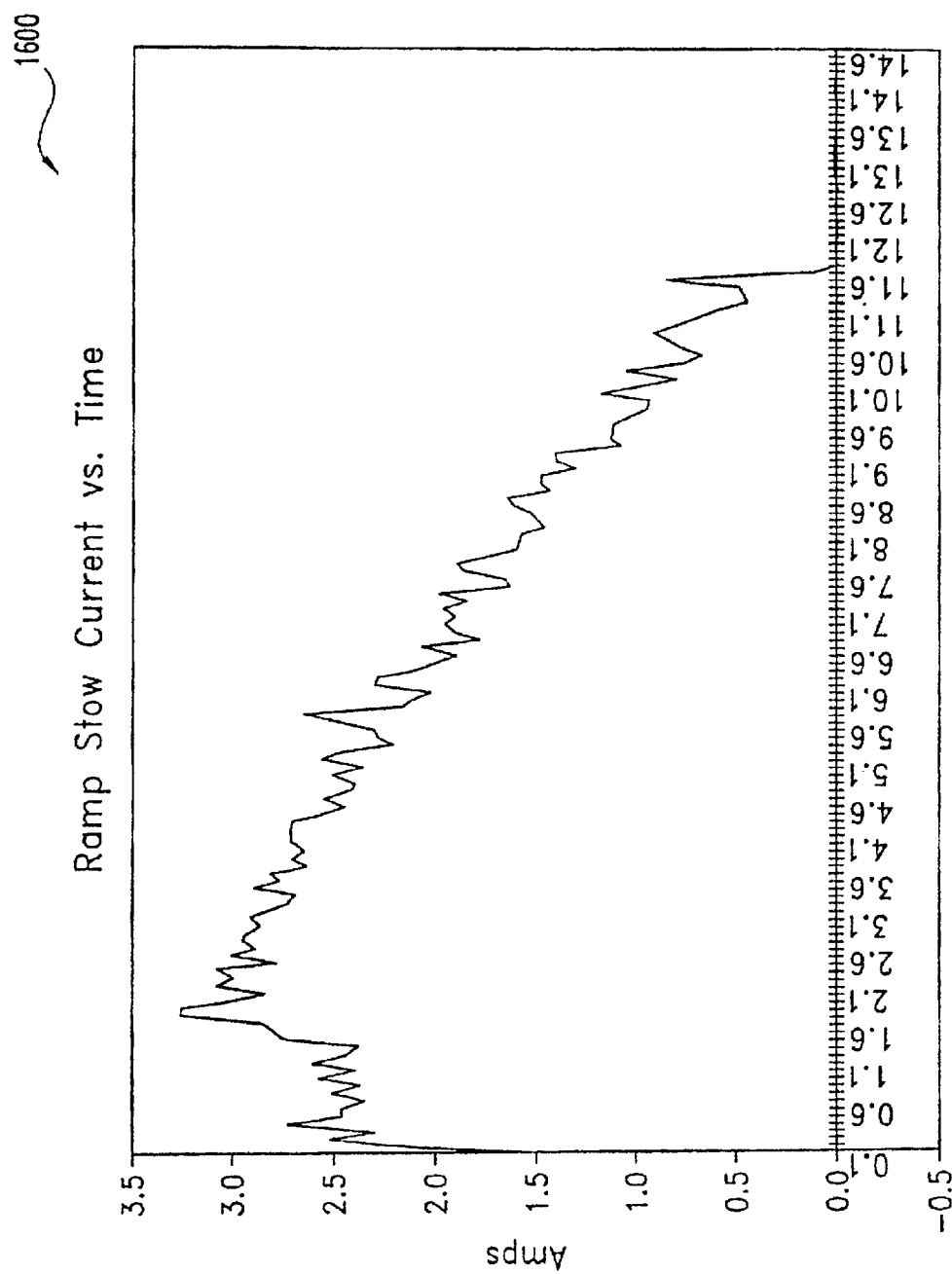
FIG. 16 shows a graph illustrating a ramp stowing current profile.

A graph 1500 showing an example of a current profile during deployment of ramp 302 is shown in FIG. 15. The current shown in graph 1500 reverses since the weight of ramp 302 (gravity) after a certain angle causes ramp motor 418 to start generating current. A graph 1600 of a sample current profile during stowing is shown in FIG. 16.

Figure 17:
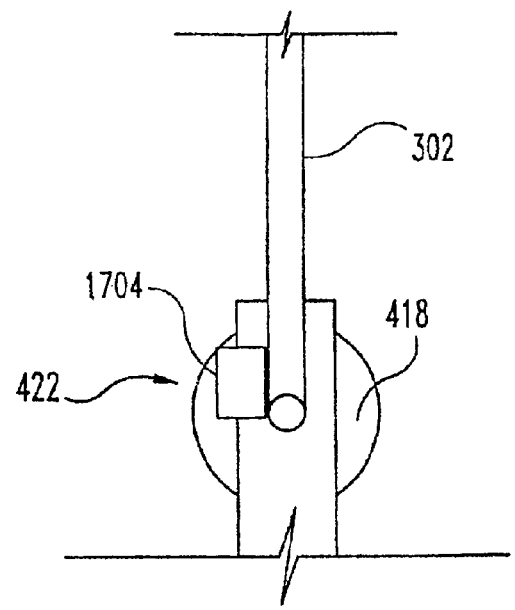
FIG. 17 shows a side view of the ramp in a first position.
Figure 18:
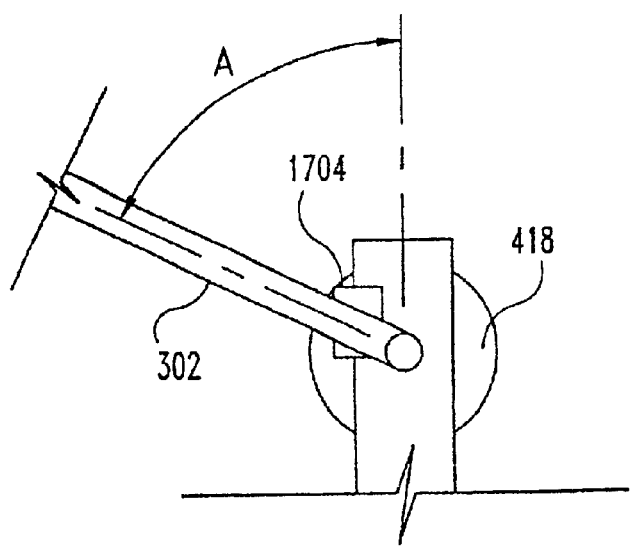
FIG. 18 shows a side view of the ramp in a second position.

As shown in FIG. 17, ramp motor 418 is coupled to ramp 302. Ramp 302 in FIG. 17 is in a stowed position. During deployment, motor 418 rotates ramp 302 for deployment. At deployment angle A, controller 408 de-energizes motor 418 and gravity is used to pull ramp 302 into a deployed position. In one embodiment, along with measuring the current drawn by ramp motor 418, controller 408 detects obstructions by measuring the travel time of ramp 302 to deployment angle A. If the travel time exceeds a specified limit, then an obstruction is detected. A deployment sensor 1704, which is one of the position sensors 422 shown in FIG. 4, is used to determine when ramp 302 is at deployment angle A. In one embodiment, deployment angle A is about forty-five (45) degrees. Deployment sensor 1704 can include any type of sensor as would be contemplated by those skilled in the art. In one embodiment, sensor 1704 is a micro-switch. De-energizing motor 418 at deployment angle A, allows for gentler contact between ramp 302 and the ground during ramp deployment. It should be understood that this position detection feature can be used with other types of ramps that do not pivot.

Figure 19:
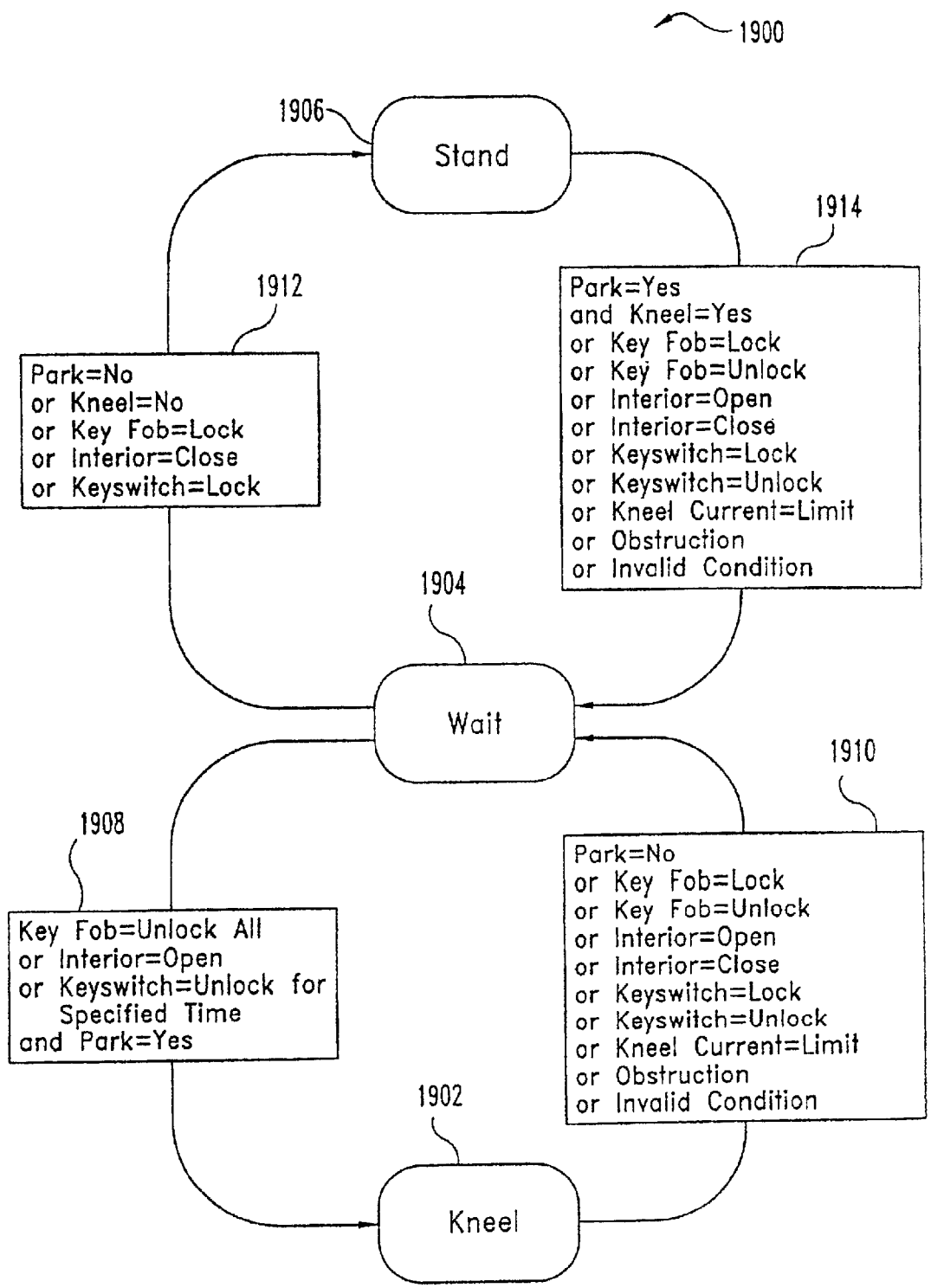
FIG. 19 shows a state diagram illustrating one process for standing and kneeling the vehicle.

A diagram 1900 illustrating a process for kneeling and standing vehicle 100 according to one embodiment of the present invention is shown in FIG. 19. Kneeling motor 416 has a kneeling state 1902, a waiting state 1904, and a standing state 1906. Controller 408 energizes kneeling motor 416 to kneel vehicle 100 in state 1902 if kneeling conditions 1908 are met. For example, if key switch 412 is in an unlocked position for a specified period of time and vehicle 100 is in park, vehicle 100 will start to be kneeled in state 1902. Controller 408 will de-energize kneeling motor 416 in wait state 1904 if wait kneeling conditions 1910 are met during kneeling state 1902. Controller 408 uses emergency start/restart operation feature, which was described above, during standing and kneeling. An operator can stop and start the kneeling/standing process by repeatedly pressing the same control button. For example, if any of controls 200, 304, 412, and/or park detection sensor 414 is activated, kneeling motor 416 will be de-energized and placed into wait state 1904. Kneeling motor 416 will also be placed into wait state 1904 when an obstruction is detected or an invalid condition exists.

Kneeling motor 416 can be energized to stand vehicle 100 in stage 1906 when standing conditions 1912 are met. For example, if vehicle 100 is placed out of park, kneeling motor 1416 will start standing vehicle 100 (in standing state 1906) so that vehicle 100 can drive properly. Standing of vehicle 100 in state 1906 will stop, for example, if vehicle 100 is placed in park and kneeled, or an invalid condition occurs. It is contemplated that conditions 1908, 1910, 1912, and 1914 can omit conditions and/or include additional conditions as would be contemplated by those skilled in the art.

Figure 20:
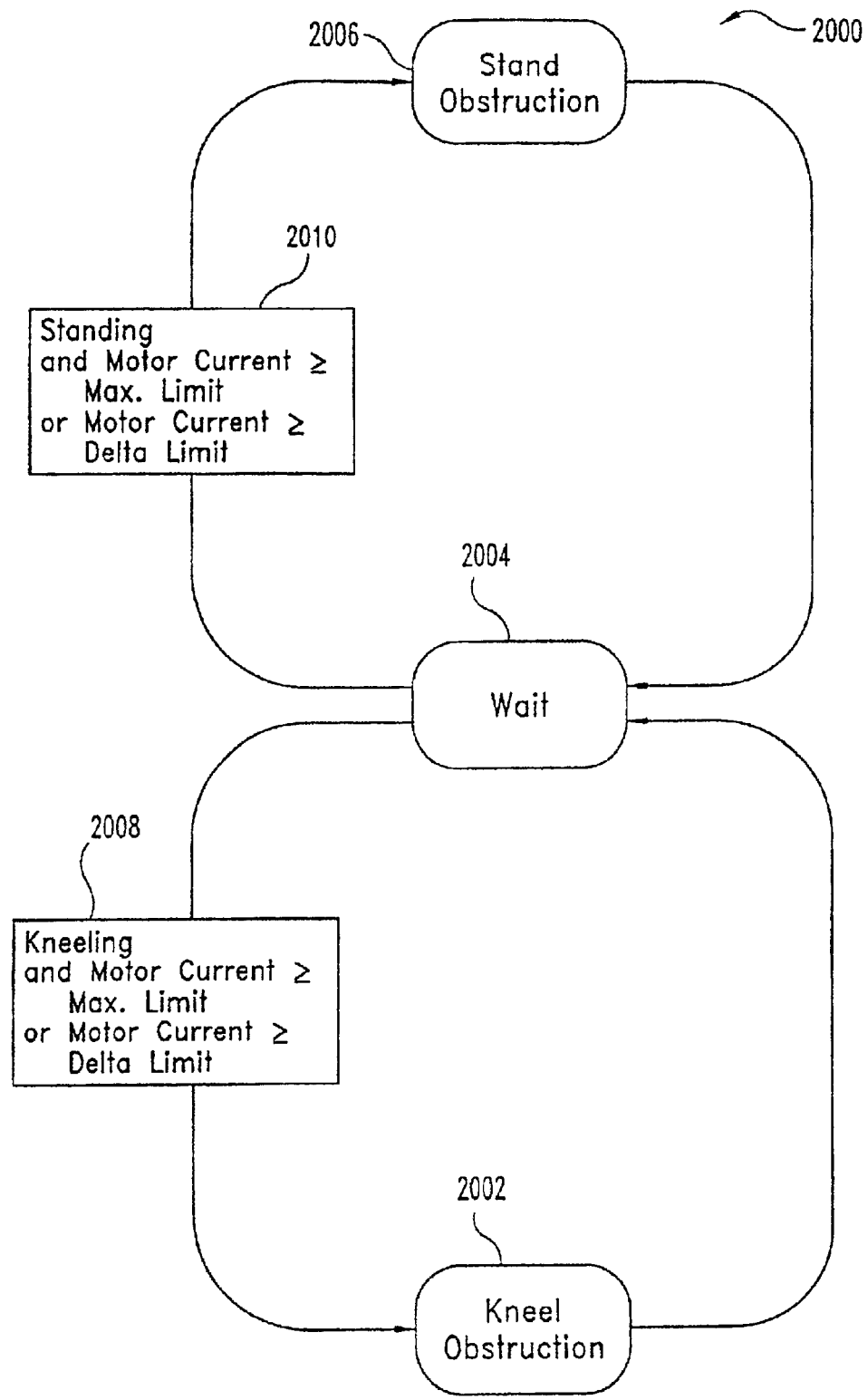
FIG. 20 shows a state diagram illustrating one process for detecting obstructions during standing and kneeling.

Obstruction detection for kneeling motor 416 is used to detect if vehicle 100 is standing or kneeling. It should be appreciated that obstruction detection for kneeling motor 416 can also be used to detect obstructions contacting vehicle 100. A diagram 2000 illustrating a process of detecting obstructions during kneeling according to one embodiment is shown in shown in FIG. 20. As shown in FIG. 20, the process includes a kneel obstruction state 2002, a wait state 2004, and a stand obstruction state 2006. The process also includes a kneeling obstruction condition 2008 and a standing obstruction condition 2010.

During kneeling, if kneeling obstruction condition 2008 is satisfied, then a kneeling obstruction is detected in state 2002. For example, if in condition 2008 the kneeling motor current is greater than or equal to a maximum limit and/or the kneeling motor current is greater than or equal to a change in current limit, then a kneeling obstruction is detected in state 2002. An obstruction during standing is detected in state 2006 if standing obstruction conditions 2010 are met. For example, if the motor current is greater than or equal to a maximum limit and/or the kneeling motor current is greater than or equal to a change in current limit in condition 2010, then a standing obstruction is detected in state 2006. In still yet another embodiment, only the maximum (motor stall condition) motor current is used to detect if an obstruction exists for both standing and kneeling. In this embodiment, the kneeling maximum current is approximately 17.3 amps and the standing maximum current is approximately 8.0 amps. In another embodiment, the maximum kneeling current is approximately 17.3 amps and the standing maximum current is approximately 4.8 amps.

Figure 21:
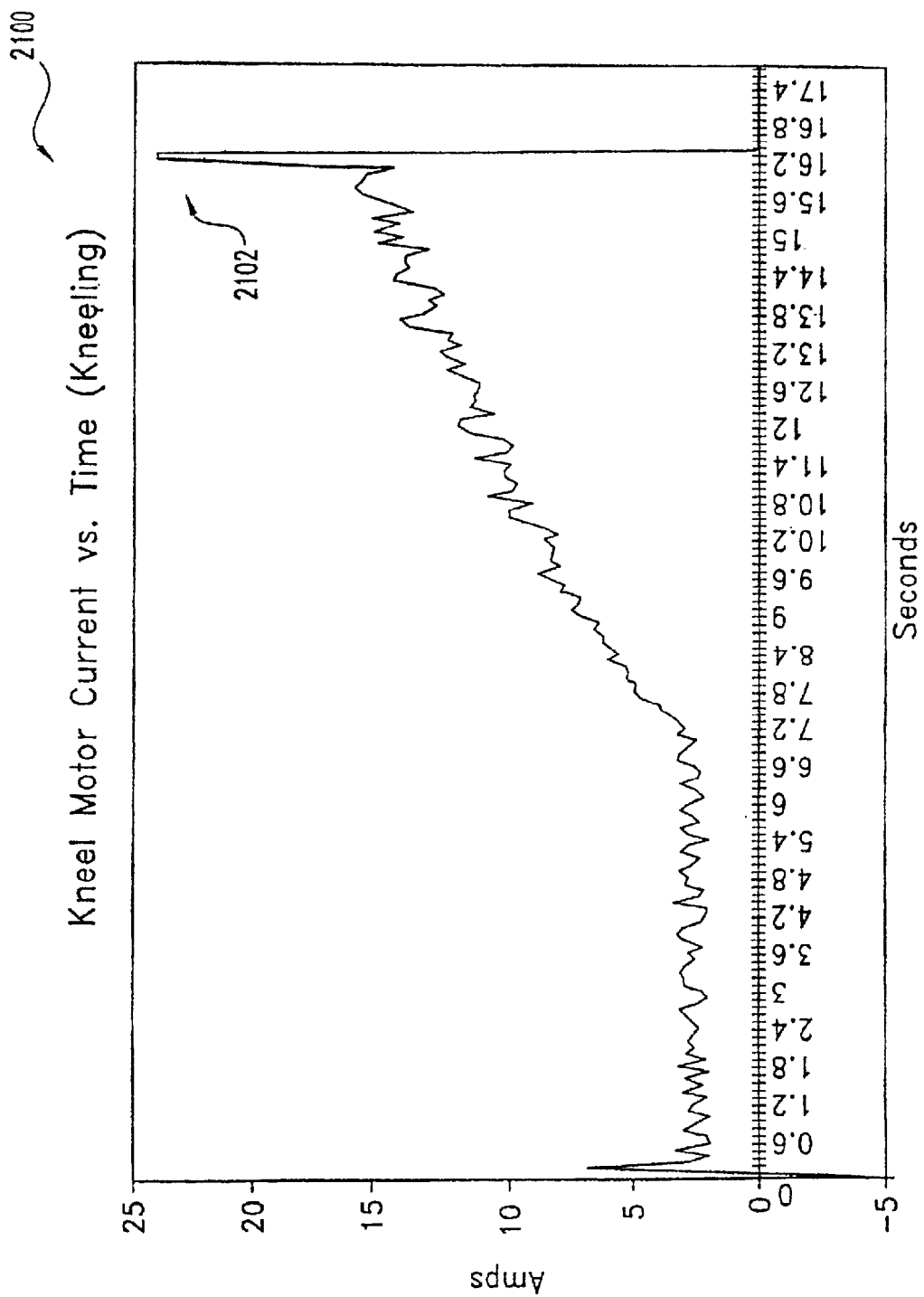
FIG. 21 shows a graph illustrating a current profile for kneeling the vehicle.
Figure 22:
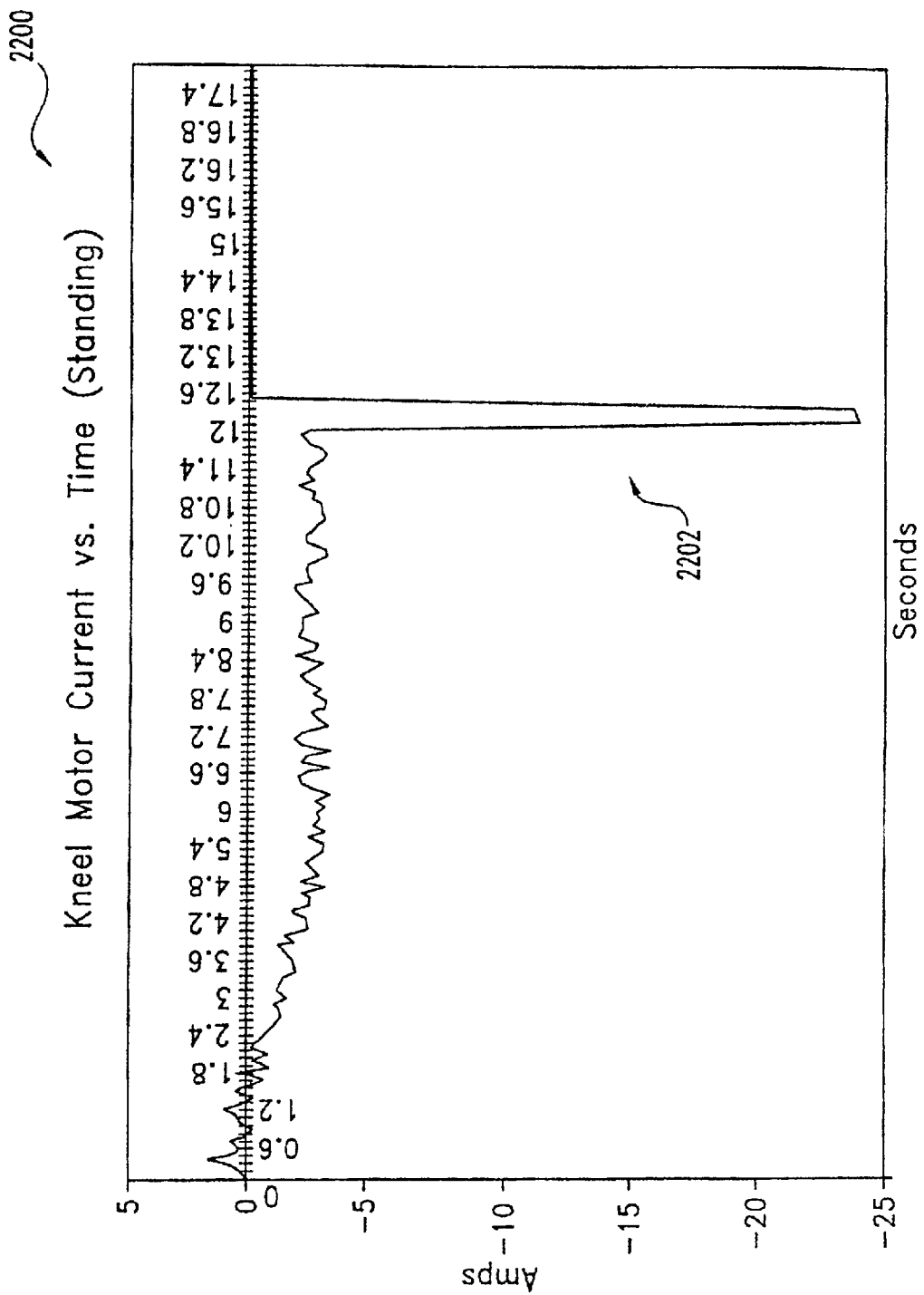
FIG. 22 shows a graph illustrating a current profile for standing the vehicle.

Graph 2100 in FIG. 21 shows the current used by the kneeling motor 416 over a complete kneeling cycle. As can be seen at the end of the cycle, a spike 2102 appears in the current that indicates that vehicle 100 is completely kneeled (kneeling motor 416 is stalled). During kneeling, the suspension springs of vehicle 100 are compressed. As shown in graph 2200 of FIG. 22, less current is required to stand vehicle 100 due to the energy stored in the compressed suspension springs. As shown at spike 2202, vehicle 100 is completely standing and current to kneeling motor 416 afterwards is de-energized.

Figure 23:
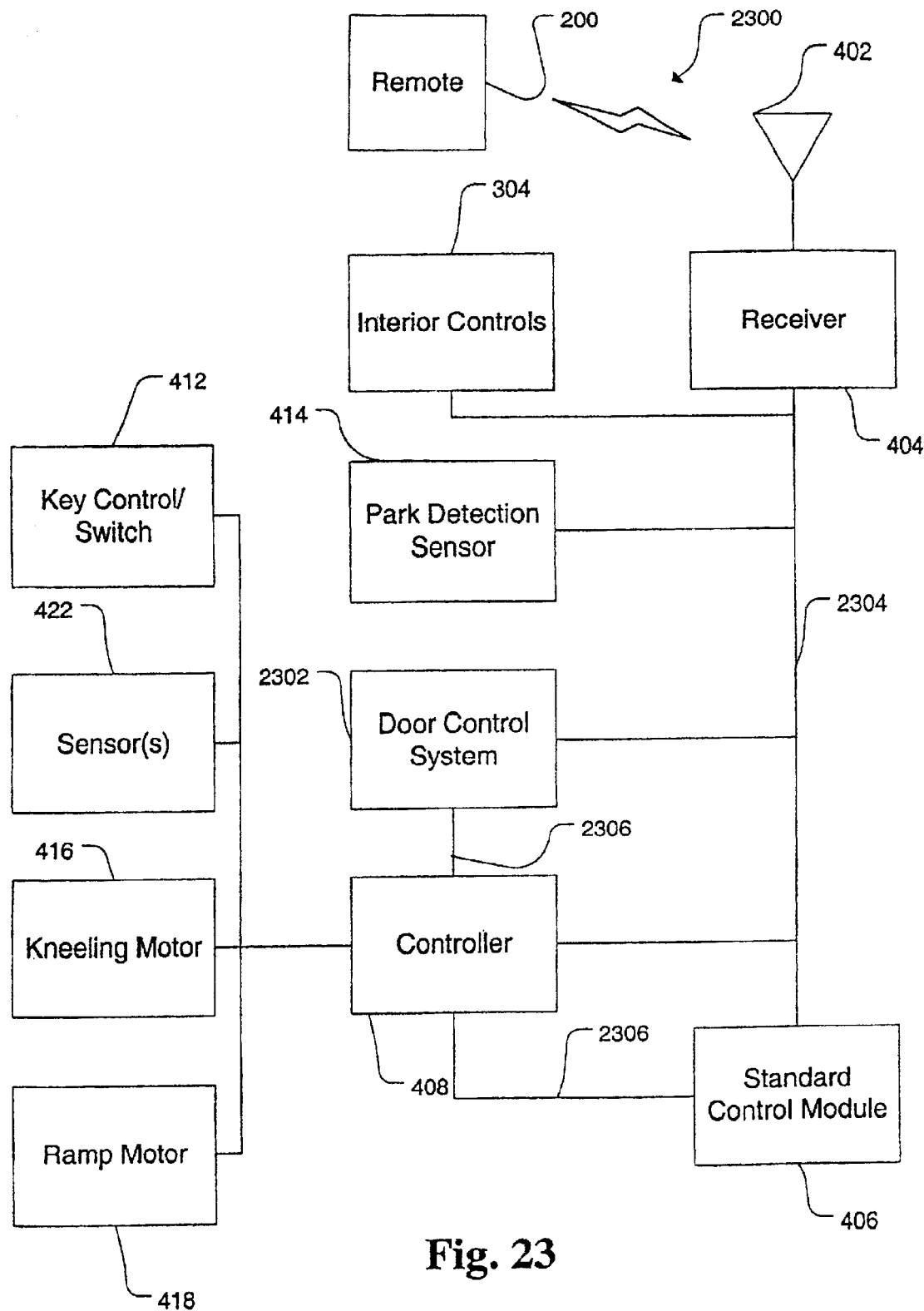
FIG. 23 shows a diagrammatic view of a control system according to another embodiment the present invention.

A vehicle control system 2300 according to another embodiment of the present invention is shown in FIG. 23. In this embodiment, standard control module 406 through door control system 2302 controls and monitors the operation of door 102, such as opening, closing and obstruction detection. As shown, door control system 2302 is operatively coupled to standard control module 406 through communication pathway 2304. Interior controls 304, receiver 404 and park detection sensor 414 are also operatively coupled to standard control module 406 through communication pathway 2304. In one embodiment, communication pathway 2304 includes an SAE J1850 bus, which is a bidirectional serial bus. These components (along with remote control 200) communicate with standard control module 406 through communication pathway 2304, which allows commands and status information to be passed between the components. Door control system 2302 is typically installed by the manufacturer of vehicle 100 and can include door motor 420 along with various types of sensors that monitor door operation. In one embodiment, door control system 2302 is a power sliding door module (PSDM) that controls the operation of a powered sliding van door. In one form, door motor 420 is separate from door control system 2302. With door control system 2302, standard control module 406 monitors and controls the operation of door 102. When an obstruction is detected during operation, door control system 2302 takes the appropriate actions, such as stopping and/or backtracking door 102. Door control system 2302 is also operatively coupled to door control system 302 through wake-up communication pathway (power control line) 2306. To conserve energy, standard control module 406 uses line 2306 to activate (wake-up) and de-energize (put to sleep) door control system 2302. In one form, a low signal on line 2306 wakes-up door control system 2302 and a high signal places door control system 2302 into a sleep mode.

As shown in FIG. 23, controller 408 is retrofitted to a vehicle that has door control system 2302 already installed. In one form, controller 408 is based on a MOTOROLA brand 68HC908AS60 microprocessor. Controller 408 is operatively coupled to communication pathway 2304 such that controller 408 can monitor communications to and from standard control module 406. Key control 412, sensors 422, kneeling motor 416 and ramp motor 418 are each operatively coupled controller 408. As should be appreciated, other components, such as interior controls 304, can be operatively coupled to controller 408. As depicted in FIG. 23, controller 408 is also operatively coupled to wake-up line 2306 between standard control module 406 and door control system 2302 so as to intercept and control wake-up and sleep signals sent to door control system 2302. By intercepting communications in communication pathway 2304 and wake-up line 2306, controller 408 coordinates and synchronizes the operation of kneeling motor 416 and ramp motor 418 with door control system 2302. Normally, when the operation of door control system 2302 is not required, controller 408 sends a sleep signal in order to keep door control system 2302 inactive. Since door control system 2302 is de-energized (asleep), it will be unresponsive to any command signals received from communication pathway 2304.

Figure 24:
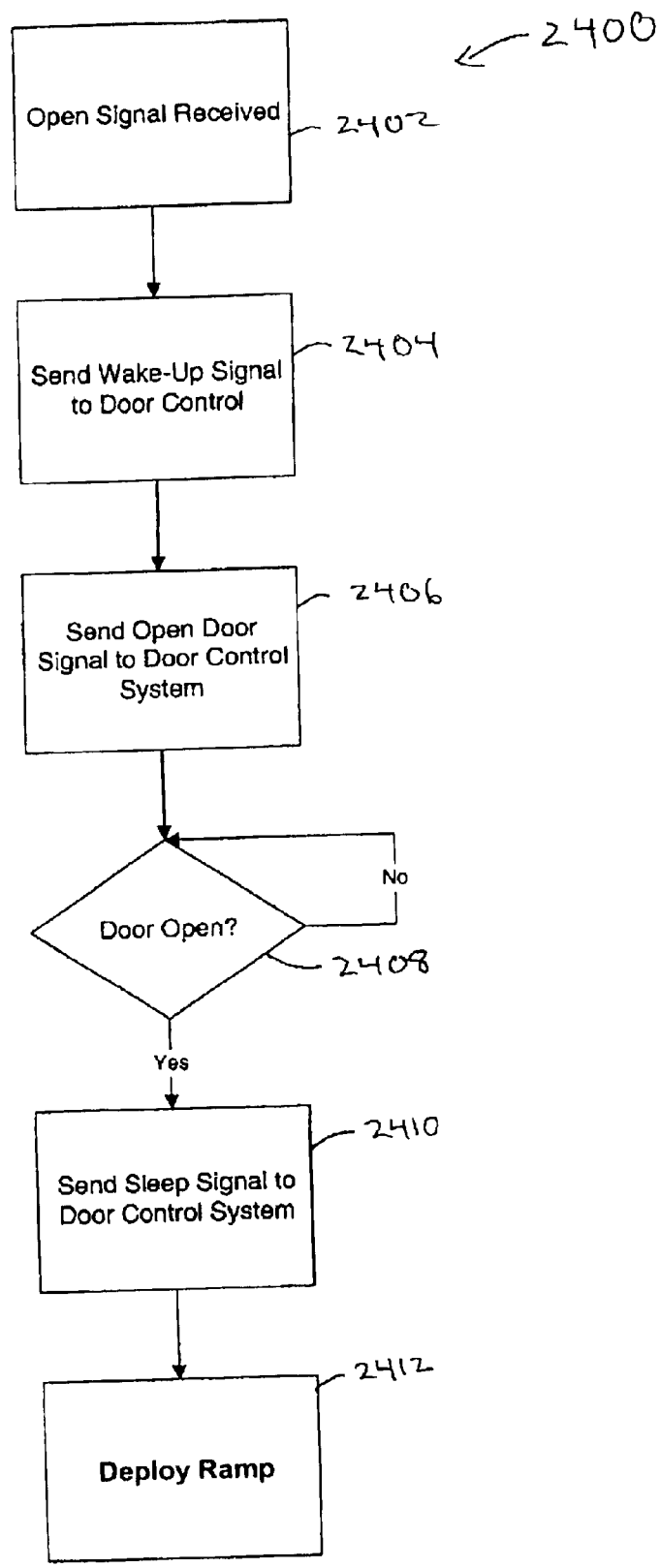
FIG. 24 shows a flow diagram illustrating one process for deploying the ramp with the control system of FIG. 23.

A technique according to one embodiment of the present invention for deploying ramp 302 with vehicle control system 2300 is illustrated with flow chart 2400 in FIG. 24. As mentioned above, door control system 2302 is normally asleep. When standard control module 406 receives an "open door" signal from interior controls 304 or receiver 404, for example, standard control module 406 sends a wake-up (low) signal on wake-up pathway 2306 and an "open" command signal on communication pathway 2304 to door control system 2302. By monitoring communication pathway 2304, controller 408 detects this "open" command signal for door control system 2302 in stage 2402. Controller 408 intercepts the wake-up signal on pathway 2306 and relays the wake-up signal on pathway 2306 to door control system 2302 in stage 2404 so that door control system 2302 is responsive to commands. Further, controller 408 retransmits the "open" command signal to door control system 2302 on communication pathway 2304 in stage 2406. In stage 2408, controller 408 monitors communication pathway 2304 for a signal from door control system 2302 indicating that door 102 is open and continues to monitor pathway 2304 until the signal is received. Once door 102 is open, door control system 2302 sends this signal over communication pathway 2304 in order to notify standard control module 406 that door 102 is open. When controller 408 detects this "opened" signal, controller 408 puts door control system 2302 back to sleep in stage 2410 by sending a sleep (high) signal on pathway 2306. Knowing door 102 is open, controller 408 in stage 2412 deploys ramp 302 and kneels vehicle 100 while at the same time monitoring for ramp and vehicle obstructions.

Figure 25:
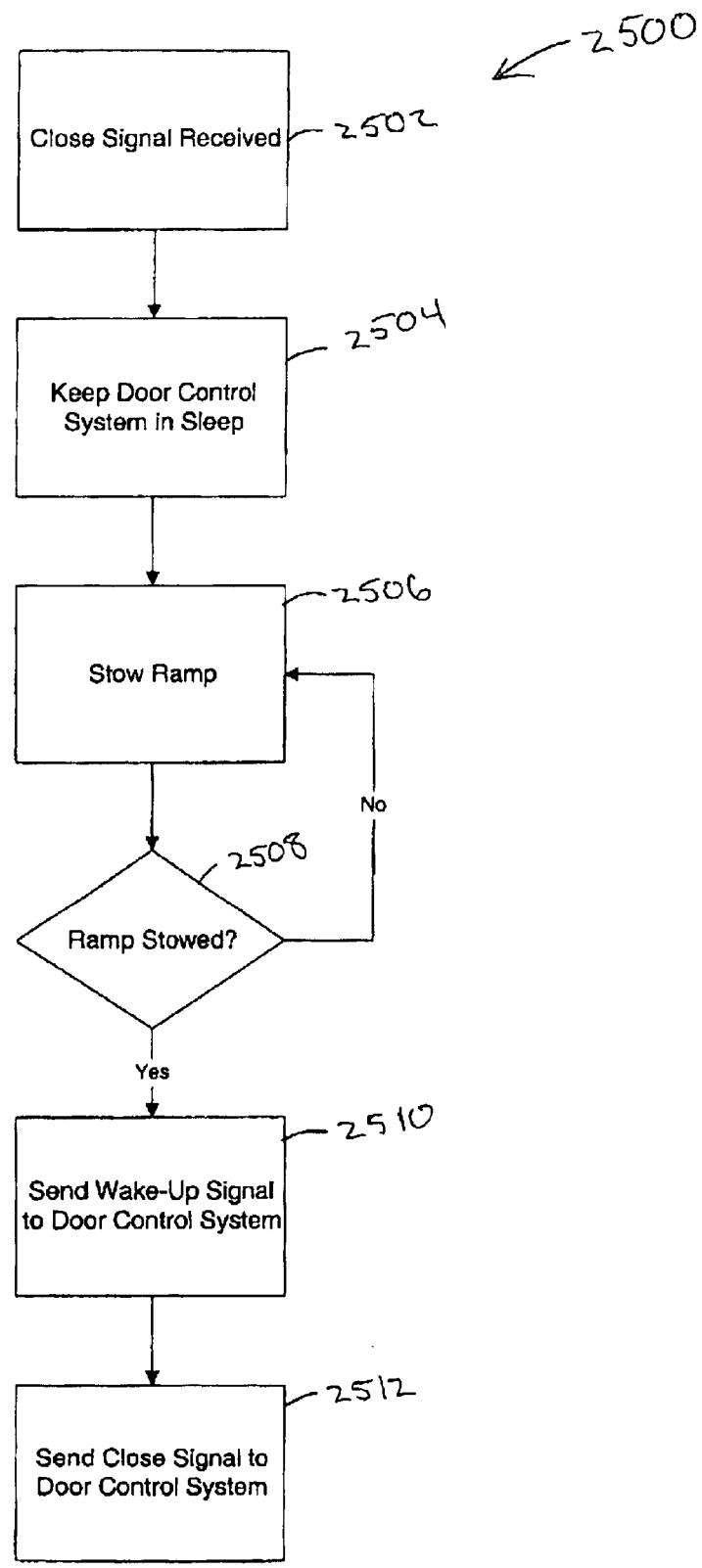
FIG. 25 shows a flow diagram illustrating one process for stowing the ramp with the control system of FIG. 23.

During door closure, controller 408 follows a similar technique by not waking up door control system 2302 until ramp 302 is fully stowed. A technique for stowing ramp 302 with vehicle control system 2300 according to one embodiment is illustrated with flow chart 2500 in FIG. 25. When standard control module 406 receives a "close door" signal from for example interior controls 304 or receiver 404, standard control module 406 sends a wake-up (low) signal on wake-up pathway 2306 and a "close" command signal on communication pathway 2304 to door control system 2302. By monitoring communication pathway 2304, controller 408 detects the "close" command from standard control module 406 in stage 2502. In another embodiment, controller monitors for the "close door" signal from interior controls 304 or receiver 404. Controller 408 in stage 2504 intercepts the wake-up signal on pathway 2306 and delays sending the wake-up signal on wake-up pathway 2306 to door control system 2302 in order to keep door control system 2302 in the sleep mode. By having door control system 2302 asleep, door control system 2302 is unable to receive and act upon the close command signal from standard control module 406. This gives controller 408 time to stow ramp 302 before closing door 102. In stage 2506, controller 408 through ramp motor 418 stows ramp 302. It should be understood that controller 408 can also through kneeling motor 416 stand vehicle 100 in stage 2506. Controller 408 continues stowing ramp 302 and checking for obstructions in stage 2508 until ramp 302 is fully stowed. Once ramp 302 is stowed, controller 408 in stage 2510 sends a wake-up (low) signal on wake-up pathway 2306 to door control system 2302 in order to activate door control system 2302. In stage 2512, controller 408 retransmits the close command signal on communication pathway 2304 to the now awakened door control system 2302, and in response, door control system 2302 proceeds with closure of door 102. During closure, door control system 2302 monitors door 102 for obstructions.

Figure 26:
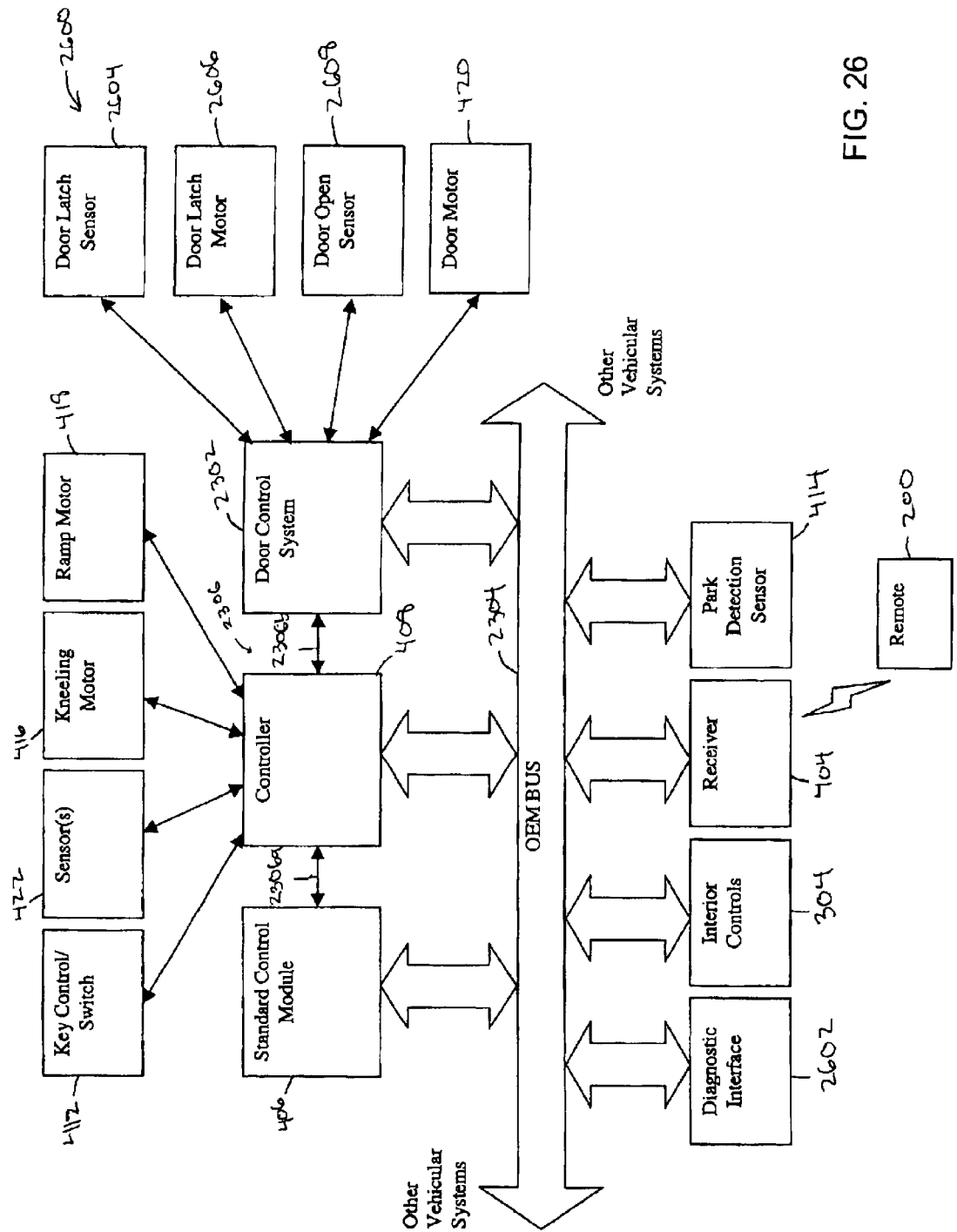
FIG. 26 shows a diagrammatic view of a control system according to a further embodiment the present invention.

A vehicle control system 2600 according to another embodiment of the present invention is illustrated in FIG. 26. One problem faced with door control systems is caused by random failures of OEM cinch latches that prevent door 102 from sealing and locking properly. While the random failure rate of cinch latches is low from the perspective of the vehicle manufacturers (OEM's), such a failure rate is considered unacceptable in the wheelchair accessibility industry. Typically, door control system 2302 only allow automatic operation of door 102 when door 102 is fully opened or closed. In circumstances where door 102 is ajar, such as when a cinch latch fails to lock door 102 into a closed position, door control system 2302 will not automatically operate until door 102 is "reset." In most cases a door 102 that has failed to close can be "reset" by manually opening door 102 to a fully opened position, a task that is easily accomplished by an able bodied individual. However, to a person with limited upper body strength, such as a person confined to a wheelchair, this task may be difficult or even impossible. If a disabled person is unable to manually reset door 102, this can create a situation in which the disabled operator can be stranded either inside or outside vehicle 100.

Vehicle control system 2600 solves the above-discussed door latch problem by allowing door control system 2302 to be automatically reset. Similar to vehicle control system 2300 of FIG. 23, system 2600 includes interior controls 304, receiver 404, park detection sensor 414, standard control module (BCM) 406, controller 408 and door control system (PSDM) 2302 all of which are operatively coupled to one another through communication pathway (OEM Bus) 2304. As discussed above, remote 200 is operatively coupled to receiver 404 through a wireless connection. As illustrated in FIG. 26, controller 408 is operatively coupled key control 412, kneeling motor 416, ramp motor 418 and sensors 422. Controller 408 is retrofitted to a vehicle 100 that has door control system 2302 already installed. Controller 408 is operatively coupled to communication pathway 2304 such that controller 408 can monitor communications to and from standard control module 406. As shown in FIG. 26, controller 408 is also operatively coupled to wake-up line 2306 between standard control module 406 and door control system 2302 so as to intercept and control wake-up and sleep signals sent to door control system 2302. In FIG. 26, wake-up line 2306 is divided into two sections, a first section 2306a that operatively couples standard control module 406 to controller 408 and a second section 2306b that operatively couples door control system 2302 to controller 408. By intercepting communications in communication pathway 2304 and wake-up line 2306, controller 408 coordinates and synchronizes the operation of kneeling motor 416 and ramp motor 418 with door control system 2302 in a manner similar to the one described above with reference to FIGS. 23–25. Vehicle control system 2600 further includes a diagnostic interface 2602 that is operatively coupled to communication pathway 2304. Diagnostic interface 2602 allows a technician to communicate with and diagnose problems related to the components that are linked together on communication pathway 2304, such as standard control module 406 or door control system 2302.

Like vehicle control system 2300 in FIG. 23, door control system 2302 in vehicle control system 2600 (FIG. 26) controls the operation of door 102 and monitors for door obstructions. As shown in FIG. 26, door motor 420, door latch sensor 2604, door latch motor 2606 and door open sensor 2608 are each operatively coupled to door control system 2302. Door control system 2302 operates door motor 420 in order to open and close door 102. Door latch sensor 2604 sense when door latch motor 2606 has actuated a door latch for door 102 into a closed or cinched position such that door 102 is completely closed, and door open sensor 2608 sense when door 102 is completely open. When door latch sensor 2604 or door open sensor 2608 detect that door 102 is not properly closed or opened, door control system 2302 sends an error signal over communication pathway 2304 to standard control module 406. For example, during door closure, if door latch sensor 2604 does not detect that the door latch is cinched within a specified period time from activation of door latch motor 2606, such as 15 seconds, door control system 2302 sends an error signal across communication pathway 2304 to standard control module 406. Door control system 2302 will be unresponsive to commands until door control system 2302 is reset by fully opening door 102. Although a single door latch sensor 2604, a single door latch motor 2606 and a single door open sensor 2608 are illustrated, it should be understood that system 2600 can include multiple numbers of these components. In one form, system 2600 includes three door latch sensors 2604.

Door control system 2302 has a service or diagnostic mode that has the ability to function individual components that are operatively coupled to door control system 2302, even when door 102 is not fully closed or opened. This service mode allows mechanics along with other technicians troubleshoot and diagnose problems in vehicle 100. For instance, a technician through diagnostic interface 2602 can send a service mode code signal to door control system 2302 in order to energize door latch motor 2606 to actuate the door latch.

Figure 27:
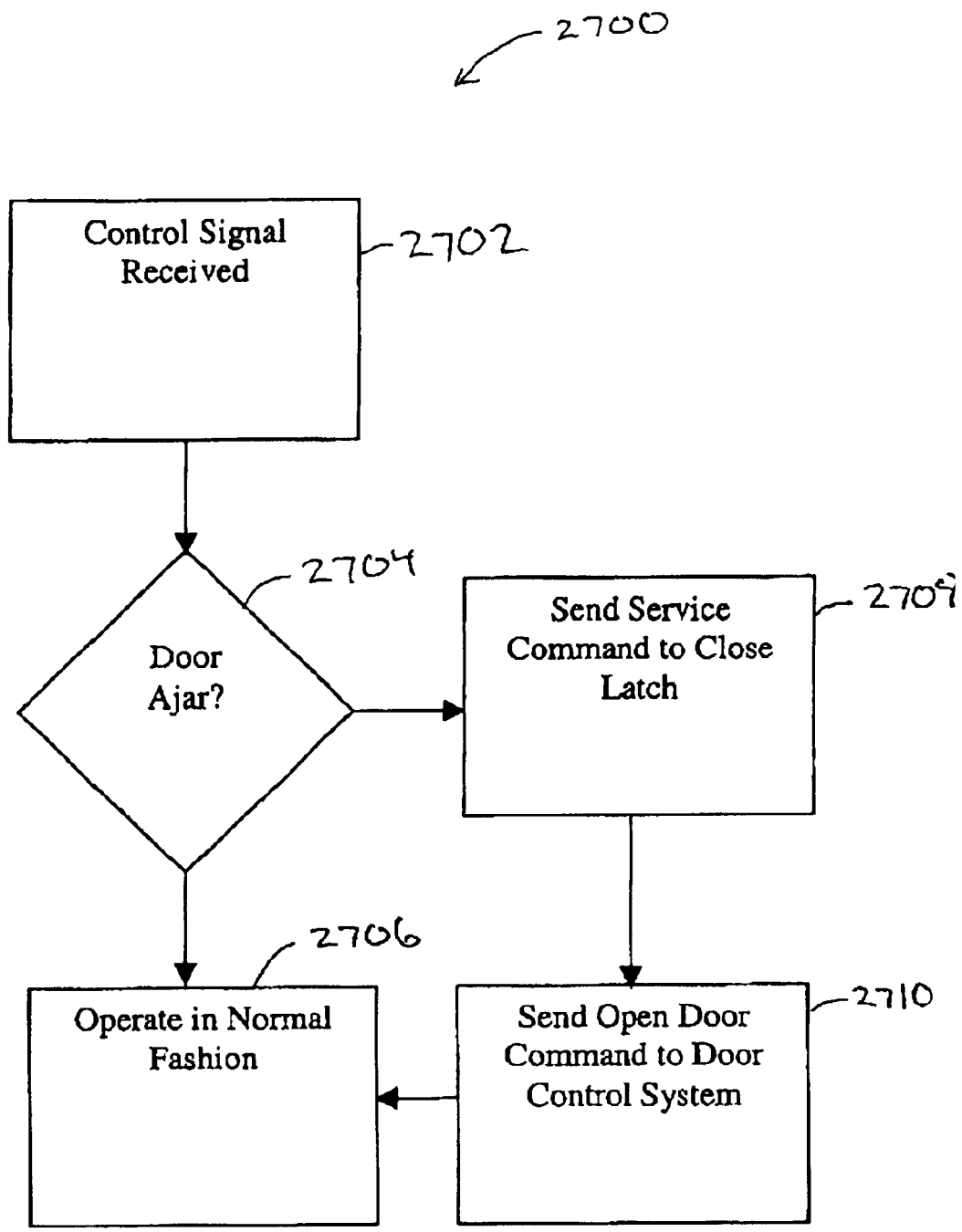
FIG. 27 shows a flow diagram illustrating one process for automatically resetting the control system of FIG. 26.

A technique according to one embodiment of the present invention, which is illustrated with flow chart 2700 in FIG. 27, uses the service operational mode to automatically reset door control system 2302. In stage 2702, controller 408 detects a control signal, such as from interior controls 304 or receiver 404, on communication pathway 2304. As mentioned above, when door 102 is ajar, door control system 2302 transmits an error signal on communication pathway 2304. From the error signal, controller 408 is able to determine whether or not door 102 is ajar in stage 2704. If door 102 is fully closed or opened, door control system 2302 will be responsive to commands, and controller 408 in stage 2706 is then able to control door control system 2302 in the manner as described above with reference to FIGS. 23–25. Otherwise, when door 102 is ajar, controller 408 in stage 2708 sends a "close door latch" service mode command on communication pathway 2304 to door control system 2302 in order to actuate door latch motor 2606 to position the door latch in a closed or cinched position. Once the door latch is positioned by latch motor 2606 in the closed position, door latch sensor 2604 sends a signal to door control system 2302 indicating that the door latch is in the closed position, and from this signal, door control system 2302 believes door 102 is completely closed. Controller 408 is then able to send a door open command to door control system 2302 in stage 2710. In response, door control system 2302 opens door 102, and once open door sensor 2608 sense that door 102 is fully open, door control system 2302 is reset and is then able to operate in a normal fashion in stage 2706.

Figure 28:
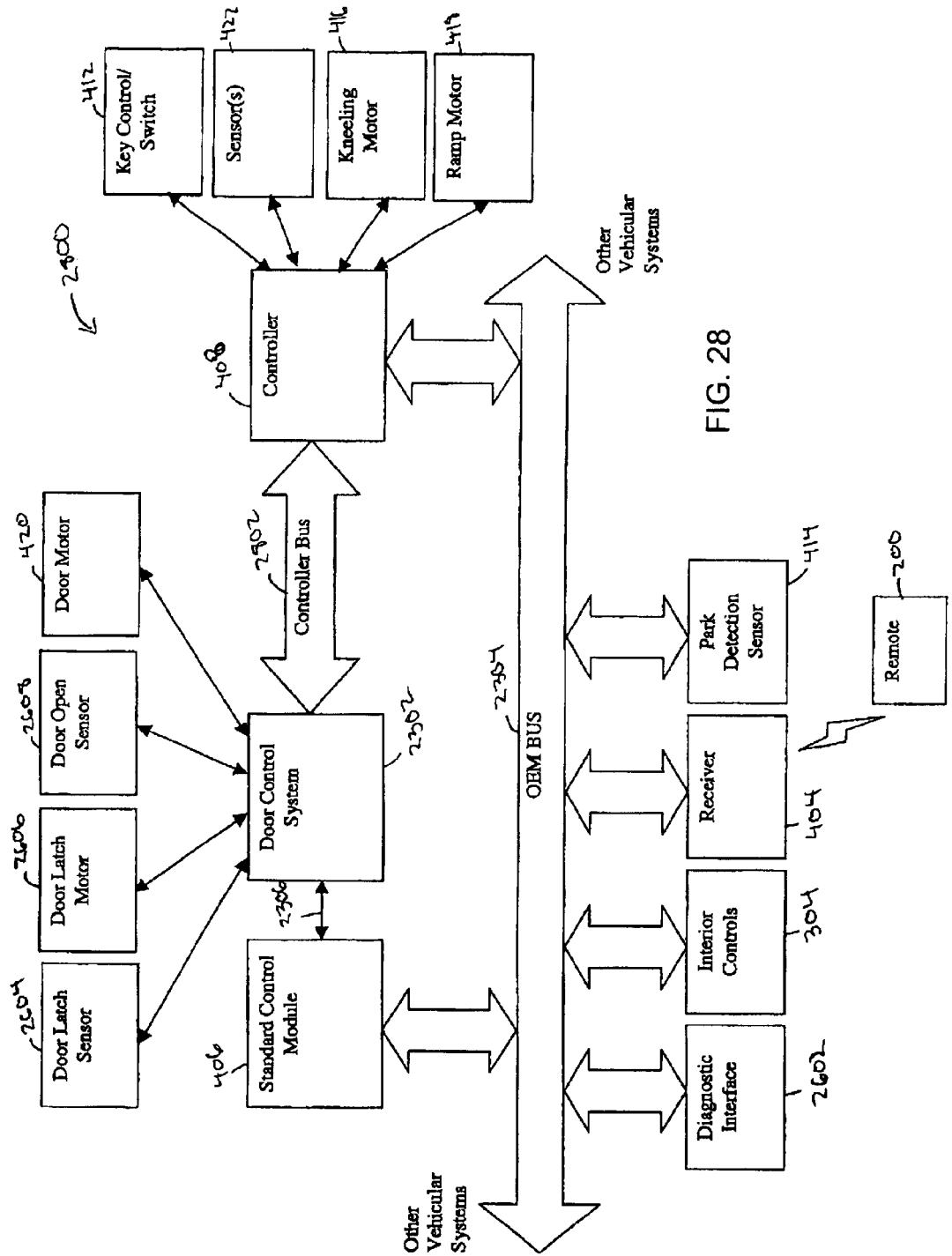
FIG. 28 shows a diagrammatic view of a control system according to another embodiment the present invention.

FIG. 28 illustrates a vehicle control system 2800 according to a further embodiment of the present invention. In this embodiment, controller 408 is practically transparent to the rest of system 2800. This configuration allows door control system 2302 to be operable at the times that were originally designed into the OEM system. By having door control system 2302 awake at the times originally designed, diagnostic commands and system fault logging in door control system 2302 are not interrupted due to door control system 2302 being asleep at the wrong time. As illustrated in FIG. 28, controller 408 is operatively coupled to door latch sensor 2604, door latch motor 2606 and door open sensor 2608. In vehicle control system 2800, diagnostic interface 2602, interior controls 304, receiver 404, and park detection sensor 414 are each operatively coupled to communication pathway 2304. Further, standard control module 406 and controller 408 are each operatively coupled to communication pathway 2304. As shown, standard control module 406 is operatively coupled directly to door control system 2306 through power control line 2306. Rather than being directly coupled to communication pathway 2304, door control system 2302 is operatively coupled to communication pathway 2304 through controller communication pathway (or secondary bus) 2802 and controller 408. In one embodiment, controller communication pathway 2802 includes an SAE J1850 bus. In the illustrated embodiment, key control/switch 412, kneeling motor 416, ramp motor 418 and sensors 422 are directly coupled to controller 408. It should be understood that key control/switch 412, kneeling motor 416, ramp motor 418 and sensors 422 can be operatively coupled to controller 408 through controller communication pathway 2802.

Figure 29:
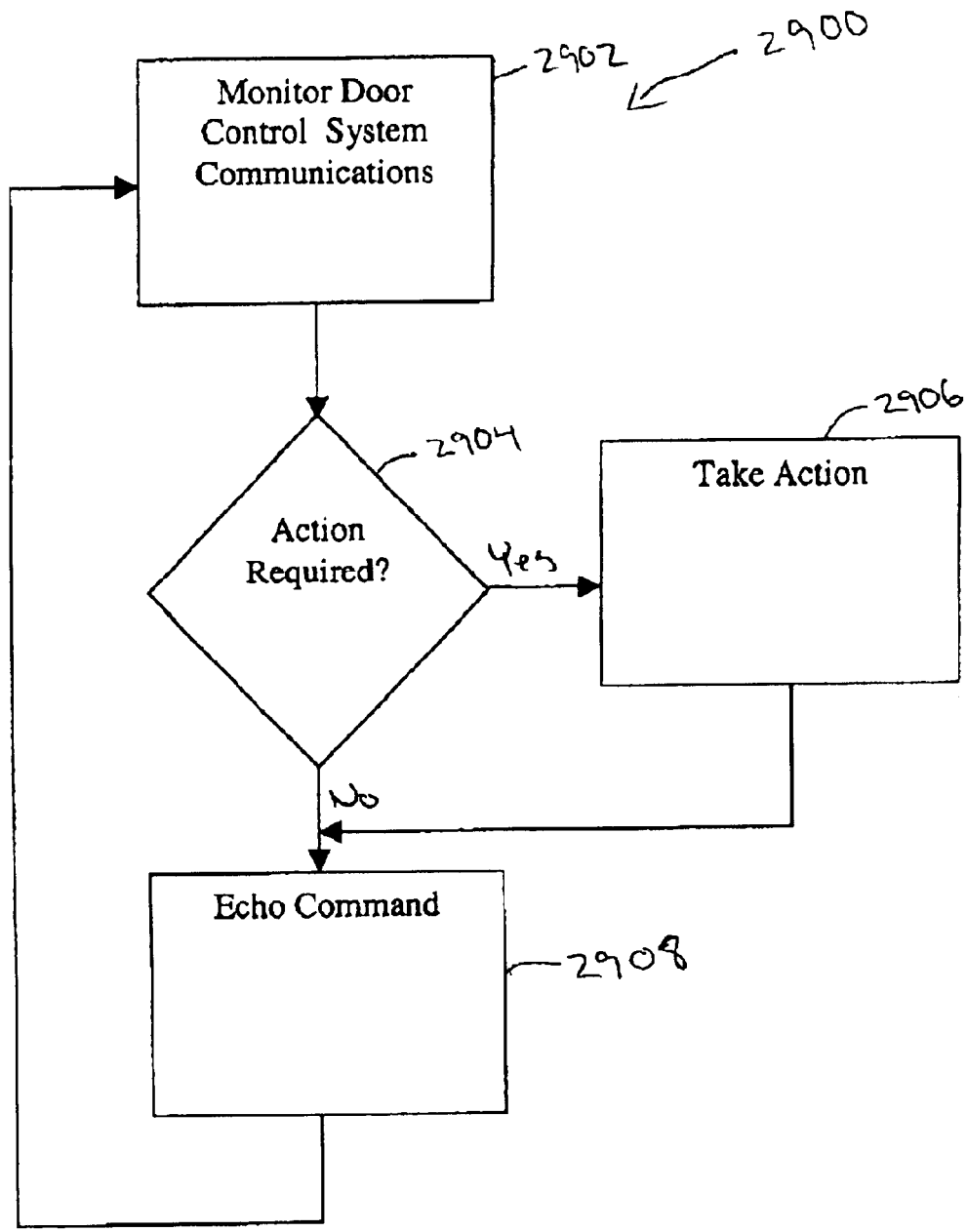
FIG. 29 shows a flow diagram illustrating one process for operating the control system of FIG. 28.

In vehicle communication system 2800, all communications to and from door control system 2302 are funneled through controller 408. A technique for processing communications with door control system 2302 according to one embodiment of the present invention is illustrated with flow chart 2900 in FIG. 29. As illustrated in FIG. 29, controller monitors door control system 2302 communications in both directions. Once a communication is received, controller 408 determines in stage 2904 whether any action is required on the part of controller 408. If action is required, controller 408 in stage 2906 takes the required action before echoing the received command in stage 2908. If no action is required in stage 2904, controller 408 echoes the command to door control system 2802 in stage 2908.

For example, when standard control module 406 is commanded to open door 102, standard control module 406 sends a wake-up signal via wake-up pathway 2306 and sends a close door command signal via communication pathway 2304. Controller 408 intercepts the close door command signal on communication pathway 2304 and determines that action needs to be taken (it needs stow ramp 302 before closing door 102). In stage 2906, controller 408 energizes ramp motor 418 to stow ramp 302 and energizes kneeling motor 416 to stand vehicle 100. After ramp 302 is stowed, controller 408 in stage 2908 sends the close door command signal via controller communication pathway 2802 to door control system 2302. In response, door control system 2302 proceeds with closure of door 102. Subsequent to echoing the close door command in stage 2908, controller 408 continues to monitor communications in stage 2902.

In another example, when standard control module 406 sends a wake-up signal via wake-up pathway 2306 and sends an open door command signal via communication pathway 2304, controller 408 intercepts the open door command signal and determines in stage 2904 that no action is required. In stage 2908, controller 408 relays the open door command signal to door control system 2302 via controller communication pathway 2802, and after relaying the signal, controller 408 continues to monitor communications in stage 2902. Once door 102 is fully open, door control system 2302 sends an open door signal along controller pathway 2802, which is intercepted by controller 408. Based on the received signal, controller 408 determines in stage 2904 that ramp 302 can now be deployed. In stage 2906, controller 408 energizes ramp motor 418 in order to deploy ramp 302 and energizes kneeling motor 416 in order to kneel vehicle 100, and in stage 2908, controller 408 echoes the open door signal from door control system 2302 to standard control module 406 via controller communication pathway 2802. It should be understood that controller 408 can process and echo other signals, such as error or fault signals from door control system 2302.

Figure 30:
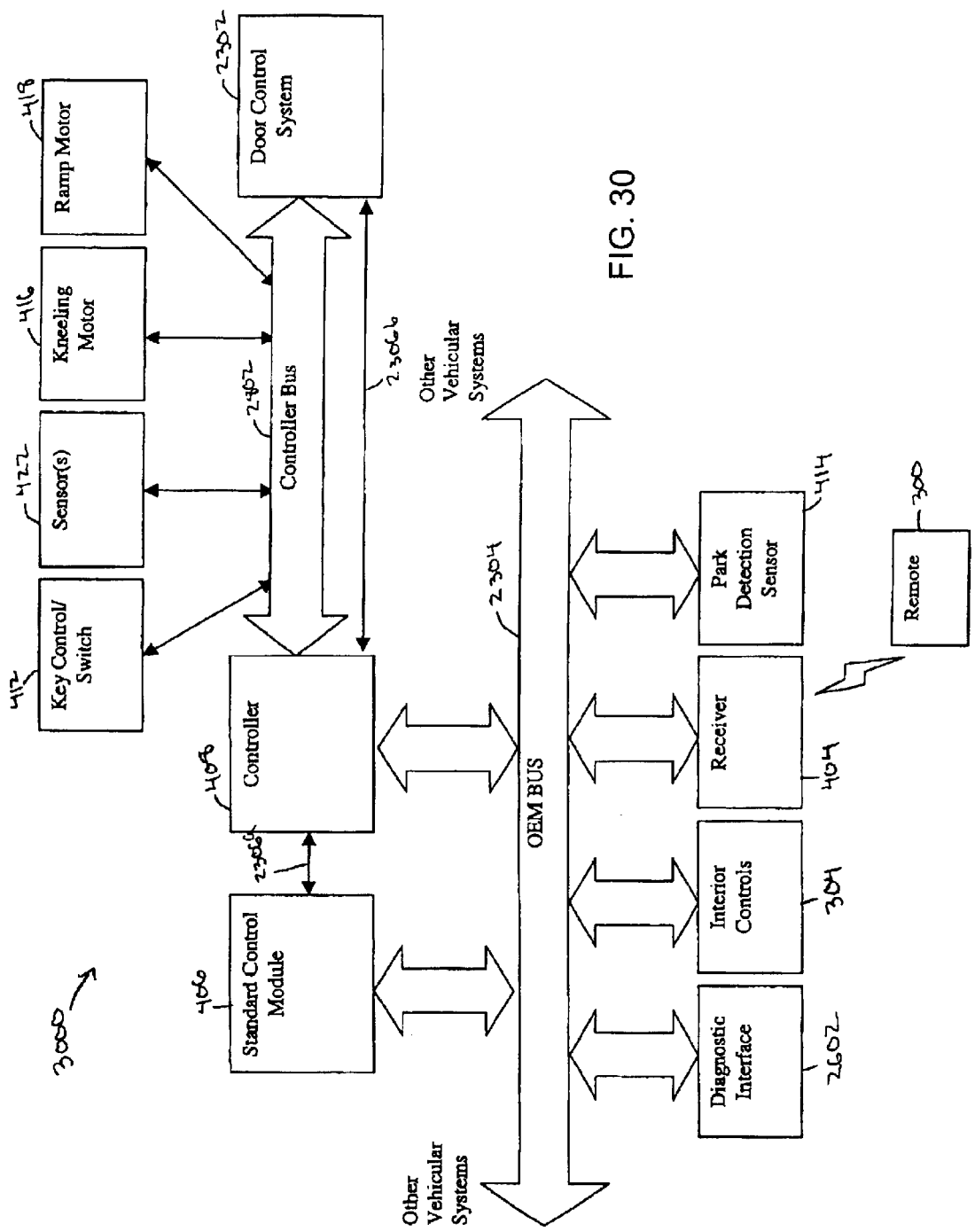
FIG. 30 shows a diagrammatic view of a control system according to another embodiment the present invention.

FIG. 30 illustrates a vehicle communication system 3000 according to another embodiment of the present invention. In the illustrated embodiment, key control 412, kneeling motor 416, ramp motor 418 and sensors 422 are operatively coupled to controller 408 through controller communication pathway 2802. Both standard control module 406 and controller 408 are operatively coupled to communication pathway 2304. Standard control module 406 and controller 408 are operatively coupled to one another through wake-up pathway 2306 (section 2306a). As shown, door control system 2302 is operatively coupled to controller 408 through both controller communication pathway 2802 and wake-up pathway 2306 (section 2306b). Controller 408 is operable to process and relay all communications to and from door control system 2302. As should be appreciated, such a configuration allows controller 408 to have greater flexibility in controlling door control system 2302. In one operational mode, controller 408 can control door control system 2302 through wake-up pathway 2306. Controller 408 can power up or down door control system 2302 in the manner as described above with reference to flowcharts 2400, 2500 and/or 2700. In another operational mode, controller 408 can control door control system 2302 by delaying and echoing command signals in the manner as illustrated with flowchart 2900. In further operational mode, controller 408 controls door system 2302 through both wake-up pathway 2306 and controller communication pathway 2802.

Using the above-described principles, the following is a partial operational overview of system 400 according to one embodiment. It should be appreciated that the other systems described above can operate in a similar fashion. Controls are used to control the operation of system 400. System 400 has a control safety interrupt feature to stop/restart opening and closing functions. The opening functions of system 400 include kneeling vehicle 100, opening door 102, and deploying ramp 302. The closing functions of system 400 include stowing ramp 302, closing door 102, and standing vehicle 100.

Buttons in system 400 can be actuated either by pressing the buttons or by pressing and then releasing the buttons. To activate the opening functions with interior controls 304, an "open" button is actuated, for example, by pressing and then releasing the button. To stop the opening functions, the open button is actuated a second time or "close" button on interior control 304 is actuated. If the open button on interior control 304 is actuated a third time, the opening functions will be reactivated. If the close button on interior control 304 is actuated instead, the opening functions will reverse to the closing functions.

In order to activate the closing functions with interior control 304, the close button on interior control 304 is actuated. The closing functions are stopped by actuating the close button a second time or by actuating the open button on interior control 304. To reactivate the closing functions, the close button is actuated again. If the open button on interior control 304 is actuated instead, the closing functions will reverse to the opening functions.

To activate the opening functions with remote control 200, unlock button 204 is actuated twice. In order to stop the opening functions, unlock button 204, lock button 202, panic button 206, or trunk button 208 can be actuated. The opening functions are reactivated if unlock button 204 is actuated twice. If instead lock button 202 is actuated once, the closing functions will start.

In order to activate the closing functions with remote control 200, lock button 202 is actuated. In order to stop the closing functions, lock button 202, unlock button 204, panic button 206, or trunk button 208 can be actuated. The closing functions are reactivated if lock button 202 is actuated a second time. If unlock button 204 is instead actuated two times, the opening functions will start.

As should be appreciated, different features of the present invention can be used by themselves or in different combinations than the ones described above. For example, either selected components or all of the components of system 400 can be incorporated into a kit that can be retrofitted to an existing vehicle.

While specific embodiments of the present invention have been shown and described in detail, the breadth and scope of the present invention should not be limited to the above described exemplary embodiments, but should be defined only in accordance with the following claims and their equivalents. All changes and modifications that come within the spirit of the invention are desired to be protected.

What is claimed is:

1. A wheelchair access system for a vehicle having a door and a ramp that provides wheelchair access to the vehicle, comprising:
   a ramp motor operable to move the ramp;
   a communication pathway;
   a controller operatively coupled to said communication pathway, said controller being operatively coupled to said ramp motor;
   a door control system operatively coupled to said controller, said door control system being operable to monitor and control operation of the door;
   a standard control module operatively coupled to said communication pathway, said standard control module being operable to send door operation commands on said communication pathway; and
   said controller being operable to selectively delay execution of said door operation commands by said door control system while operating said ramp motor to move the ramp.

2. The system of claim 1, further comprising:
   a power communication pathway operatively coupling said standard control module to said door control system; and
   wherein said standard control module is operable to send a wake signal on said power communication pathway to place said door control system in a wake mode, wherein the door control system is responsive to commands in said wake mode.

3. The system of claim 2, wherein:
   said controller is operatively coupled between said standard control module and said door control system on said power communication pathway; and
   said controller is operable to delay sending said wake signal on said power communication pathway to said door control system until said ramp motor stows the ramp.

4. The system of claim 1, further comprising:
   a second communication pathway operatively coupling said controller to said door control system;
   wherein said standard control module is operatively coupled to said door control system through said controller and said second communication pathway; and
   wherein said controller is operable to control said ramp motor in order to move the ramp before echoing a command signal from said standard control module to said door control system on said second communication pathway.

5. The system of claim 4, wherein said ramp motor is operatively coupled to said controller through said second communication pathway.

6. The system of claim 1, further comprising:
   a door latch motor operatively coupled to said standard control module;
   a door latch sensor operatively coupled to said standard control module; and
   wherein said controller is operable to send a service code to said standard control module to actuate said latch motor when the door is ajar.

7. The system of claim 6, wherein said door latch motor and said door latch sensor are operatively coupled to said standard control module through said communication pathway.

8. The system of claim 1, wherein:
said communication pathway includes a bidirectional serial bus;
said door control system includes a power sliding door module; and
said standard control module includes a body control module.

9. The system of claim 1, wherein said controller is operable to detect ramp obstructions by monitoring current drawn by said ramp motor.

10. The system of claim 1, further comprising:
the ramp operatively coupled to said ramp motor;
the door; and
wherein said door control system includes a door motor to move the door.

11. A method of providing wheelchair access to a vehicle having a door and a ramp, comprising:
sending door operation commands via a communication pathway;
suspending operation of the door operation commands of a door control system to selectively delay execution of the door operation commands operable to control movement of the door of the vehicle in order to prevent operational interference between the door and the ramp; and
moving the ramp of the vehicle by operating a ramp motor coupled to the ramp after said suspending operation of the door control system.

12. The method of claim 11, wherein said suspending operation of the door control system includes placing the door control system into a sleep mode, wherein the door control system is unresponsive to commands when in the sleep mode.

13. The method of claim 12, further comprising:
placing the door control system in a wake mode before said placing the door control system into the sleep mode,
wherein the door control system is responsive when in the wake mode;
opening the door of the vehicle with the door control system while the door control system is in the wake mode; and
wherein said moving the ramp includes deploying the ramp.

14. The method of claim 12, further comprising:
wherein said moving the ramp includes stowing the ramp;
placing the door control system in a wake mode after said stowing the ramp, wherein the door control system is responsive when in the wake mode;
closing the door of the vehicle with the door control system after said placing the door control system in the wake mode.

15. The method of claim 11, wherein said suspending operation of the door control system includes delaying receipt of a command to operate the door at the door control system.

16. The method of claim 15, wherein:
said moving the ramp includes stowing the ramp; and
said delaying receipt of the command includes transmitting a close door command to the door control system after said stowing the ramp.

17. The method of claim 11, wherein said suspending operation of the door control system includes placing the door control system into a sleep mode, wherein the door control system is unresponsive to commands when in the sleep mode.

18. The method of claim 11, wherein said suspending operation of the door control system includes delaying receipt of a command to operate the door at the door control system.

19. A method of providing wheelchair access to a vehicle having a door and a ramp, comprising:
suspending operation of a door control system that is operable to control movement of the door of the vehicle in order to prevent operational interference between the door and the ramp;
moving the ramp of the vehicle by operating a ramp motor coupled to the ramp after said suspending operation of the door control system;
providing a door latch motor for a door latch of the door of the vehicle;
detecting the door of the vehicle is ajar before said suspending;
resetting the door control system in response to said detecting by sending a service mode command to the door control system to actuate the door latch; and
opening the door to a fully opened position with the door control system after said resetting.

20. A method of providing wheelchair access to a vehicle having a door and a ramp, comprising:
suspending operation of a door control system that is operable to control movement of the door of the vehicle in order to prevent operational interference between the door and the ramp;
moving the ramp of the vehicle by operating a ramp motor coupled to the ramp after said suspending operation of the door control system,
wherein said moving the ramp includes deploying the ramp;
kneeling the vehicle; and
detecting a ramp obstruction during said deploying by monitoring current drawn by the ramp motor.

21. A wheelchair access system for a vehicle having a door and a ramp that provides wheelchair access to the vehicle, comprising:
a ramp motor operable to move the ramp;
a controller operatively coupled to said ramp motor;
a door control system operatively coupled to said controller, said door control system being operable to monitor and control operation of the door; and
said controller being operable to selectively delay execution of said door operation commands by said door control system while operating said ramp motor to move the ramp.

22. The system of claim 21, wherein said controller is operable to detect ramp obstructions by monitoring current drawn by said ramp motor.

23. A method of providing wheelchair access to a vehicle having a door and a ramp, comprising:
sending door operation commands;
suspending operation of the door operation commands of a door control system to selectively delay execution of the door operation commands operable to control movement of the door of the vehicle in order to prevent operational interference between the door and the ramp; and
moving the ramp of the vehicle by operating a ramp motor coupled to the ramp after said suspending operation of the door control system.

* * * * *